United States Patent [19]

Nichols et al.

[11] Patent Number: 5,614,913
[45] Date of Patent: Mar. 25, 1997

[54] OPTIMIZATION OF SURVEY COORDINATE TRANSFORMATIONS

[75] Inventors: Mark Nichols, Sunnyvale; Kenneth W. McBride, Los Altos, both of Calif.; Ian Viney, St. Martins, New Zealand; Arthur Taylor, Basingstoke, United Kingdom; Richard Jackson, St. Albans, New Zealand; John F. Schipper, Palo Alto, Calif.

[73] Assignee: Trimble Navigation, Sunnyvale, Calif.

[21] Appl. No.: 476,844

[22] Filed: Jun. 7, 1995

[51] Int. Cl.$^6$ ..................................................... G01S 5/02
[52] U.S. Cl. ............................................................... 342/357
[58] Field of Search ........................................ 342/357, 352; 364/731, 815

[56] References Cited

U.S. PATENT DOCUMENTS 5,307,289  4/1994  Harris ........................................ 364/516

Primary Examiner—Gregory C. Issing
Attorney, Agent, or Firm—John Schipper

[57] ABSTRACT

A system for selecting an optimal transformation T(G2;G1) between a first ellipsoid E1 (e.g., WGS 84) in a first global coordinate system G1, relative to which the survey measurements are made, and a second ellipsoid E2 in a second global coordinate system G2. A set of location coordinates $(x'_{m,2}, y'_{m,2}, z'_{m,2})$ for M previously-surveyed locations, numbered $m=1, \ldots, M$, and a set of location coordinates $(x'_{n,1}, y'_{n,1}, z'_{n,1})$ for N presently-surveyed locations, numbered $n=1, \ldots, N$ ($M \leq N$) are provided, where the first M presently-surveyed locations coincide with the M previously-surveyed locations. The transformation is chosen so that the images of the location coordinates $(x'_{n,1}, y'_{n,1}, z'_{n,1})$ for $n=1, \ldots, M$ under T(G2;G1) are as close as possible to the corresponding location coordinates $(x'_{m,2}, y'_{m,2}, z'_{m,2})$ for $m=1, \ldots, M$. Given an ellipsoid and a selected survey plane $\tau 0$ that is tangent to the ellipsoid at a selected location, a set of selected locations can be surveyed with reference to the ellipsoid, and the location coordinates of each such surveyed location can be mapped into a corresponding "survey location," defined by reference to a local coordinate system that uses the survey plane $\tau 0$ as its base. These transformations and projections are determined and optimized in real time, while a surveyor is measuring the presently-surveyed locations in the field. The instruments used for surveying may be part of a location determination system, such as a Global Positioning System, a Global Orbiting Navigational Satellite System or Loran.

15 Claims, 5 Drawing Sheets

OPTIMIZATION OF SURVEY COORDINATE TRANSFORMATIONS

FIELD OF THE INVENTION

This invention relates to determination of location coordinates of survey locations and optimization of transformations between coordinate systems used for such surveys.

BACKGROUND OF THE INVENTION

A survey of locations at a survey site may involve use of location coordinates from previously-surveyed locations, such as recognizable landmarks and other survey monuments, together with generation of location coordinates for newly-surveyed locations. Even where location coordinates for only newly-surveyed locations are used, these coordinates may not be fully consistent with each other when corrections are made for any errors introduced by use of a local coordinate system. The location coordinates of these locations, representing newly-surveyed locations and/or previously-surveyed locations, must be made consistent with each other in some "best fit" sense. Several workers have considered the problems of representation of locations on a map or chart display and/or adjustment of location coordinates.

Maps and charts have been prepared and used in connection with various location determination systems (LDSs), such as GPS, GLONASS, Loran, Tacan, Decca, Omega, VOR, DME, JTIDS, PLRS and an FM subcarrier system. Potter et al, in U.S. Pat. No. 3,659,085, disclose use of a computer for determining the location of objects in a chosen coordinate system. A mobile station in an aircraft, marine vessel or land vehicle, moving relative to the local landscape, transmits pulse signals to a large number of signal receiving stations, all linked to a central computer. Time of signal arrival, trilateralization, differential time of arrival or other techniques are used to solve for the present location of the mobile station, based on receipt of the transmitted signals and weighting of received signals to minimize some associated errors. Iterative computations are used to determine the optimum weighting.

In U.S. Pat. No. 4,135,190, DiMatteo et al disclose a navigational plotter system including a geographical map with location lines prepared with the aid of a Loran or Omega LDS. Intersections of location lines with coordinate baselines located on the map are recorded in coded form for direct readout of a selected location, for tracking of location and/or movement of a vehicle or vessel across the two-dimensional surface represented by the map.

A navigation display that provides a continuous pictorial or graphical display of the present location of a movable vehicle or vessel, using an LDS such as VOR, Loran, ADF, DME or Tacan, is disclosed by Scovill in U.S. Pat. No. 4,253,150. The charts are stored on photographic film, and the portion of the film displayed is varied to include the present location. This system can be used to provide readout of present ground speed of the vehicle or vessel, bearing, and estimated time to reach a waypoint or the destination. Most of the discussion is concerned with positioning of the portion of the film displayed.

In U.S. Pat. No. 4,428,052, Robinson et al disclose a navigational aid and autopilot system that includes display of a selected portion of a chart showing the location of a vehicle or vessel being tracked. The vehicle or vessel location may be shown at the center or near an edge of the portion of the chart displayed. Water and nearby land masses may be displayed on the selected portion of the chart, as well as relevant information such as the depth of the water at a location near a land mass.

Setlift et al disclose an electronic chart system that stores and visually displays a plurality of charts or maps digitally, where the charts have been prepared using a location determination system, such as Loran, in U.S. Pat. No. 4,428,057. The visually displayed image can be compressed or expanded to meet the current needs of the viewer. Each point on the chart is given an index, indicating whether that point is "land" or "water." Navigation information, such as location and bearing for a moving object, is available.

A navigation system, including an integrated electronic display for charts or maps prepared by a location determination system such as Loran or Decca, is disclosed in U.S. Pat. No. 4,590,569, issued to Rogoff et al. A plurality of charts is stored digitally and displayed as needed, together with alphanumeric data such as location coordinates, bearing, waypoints, and estimated time before arrival at a waypoint or destination. Radar return signals are received from nearby land masses, and this information is superimposed on the stored images in some situations. If the object tracked is located off-shore, the off-shore LDS receives (Loran) offset data from a plurality of on-shore LDS monitors to periodically correct the location of the off-shore object.

U.S. Pat. No. 4,685,068, issued to Greco et al, discloses a map digitization and feature extraction system that uses pattern recognition to add editable features, such as terrain elevation, vegetation, water storage and transport facilities, and electrical communication lines, to an electronic map that is being assembled. The added features are drawn from one or more separate databases, and features of the same class can be given the same color for display. A first visual display monitor for an interim or working display and a second monitor for final display, are preferably positioned adjacent to each other. A paper map, used for feature placement or details, is cut or sectioned into rectangles of length corresponding to a few km on a side, and the sections are scanned into a computer for storage and subsequent use.

Green et al disclose a method for accurately displaying location information, obtained from a Loran system, on a map in U.S. Pat. No. 4,791,572. The actual locations of various Loran antenna monuments are determined and used together with Loran data to enhance the accuracy of a location on the map, by distorting map grid lines if necessary. Reconciliation of a location shown on two different maps is not provided.

A map-aided navigation system that uses TERCOM-SITAN control signals is disclosed by U.S. Pat. No. 4,829,304, issued to Baird. An aircraft flies over terrain to be mapped and estimates aircraft location and altitude at a sequence of sampling points. These data are Kalman filtered, and the resulting filtered data are used to determine elevation and slope for this terrain. On a subsequent flight over this terrain, an aircraft uses altimeter sensing and the terrain map to determine the most likely flight path actually followed by the aircraft.

A system for calibrating the locations of non-contact measurement sensors is disclosed in U.S. Pat. No. 4,841,460, issued to Dewar et al. A target is positioned within the measuring zone of one or more sensors and within the measuring zone of an external location determination system (LDS). Each sensor, together with the LDS, determines the location coordinates of the target within the reference frame of the measuring instrument, and transform matrices are used to relate these location coordinates in the different frames to a selected coordinate system. The sensors are calibrated by requiring that the different location coordinates for the target agree with each other, when expressed in the selected coordinate system.

Gray et al disclose a method for accurately updating location information contained in a digital map, in U.S. Pat. No. 4,891,761. A vehicle is dispatched to a neighborhood of an unknown location, which may be a landmark that has not yet been surveyed. The vehicle moves along a segment between a known landmark, such as an already-surveyed intersection and the unknown location and transmits location information to a central station to produce an updated digital map.

U.S. Pat. No. 4,899,161, issued to Morin et al, discloses a coordinate conversion system for air traffic control applications. Radar observable variables, such as target slant range, azimuth angle and altitude are transformed to a selected coordinate system centered at the target. The system converts from geodetic coordinates to ellipsoidal or conformal spherical coordinates, then to target location coordinates, followed by stereographic projection that preserves azimuthal angles for display of the target-aircraft spatial relationship. Elevation information is not available after stereographic projection is implemented.

A method for representing digitized image data for forming cross-sectional images of an object is disclosed by Essinger et al in U.S. Pat. No. 4,939,646. This method is useful in computer-assisted tomography, magnetic resonance imaging and other fields where three-dimensional representations are needed. A two-dimensional "slice" of a three-dimensional object is limited by a boundary curve, and image features within this curve are represented as locations in polar coordinates. A locus of points equidistant from and lying within the boundary curve is used for feature location and placement. Another method of digitizing two-dimensional sections of a three-dimensional object is disclosed by Koch in U.S. Pat. No. 5,231,470.

In U.S. Pat. No. 4,939,661, issued to Barker et al, a marine navigation system that represents locations in cells that cumulatively cover an entire region is disclosed. Only those cells that contain a portion of a coastline have much associated location data.

A vehicle navigation system that uses local topographical maps to correct an aircraft flight path is disclosed in U.S. Pat. No. 4,939,663, issued to Baird. During flight, local altitude measurements are made and used with a digital database containing local elevation (above a ground reference surface) of the Earth's surface. The location of the aircraft is sampled separately and is compared with the local elevation contour corresponding to the altimeter measurement; a location correction is determined that places the aircraft location over the elevation contour. Here, the local altitude coordinate of the aircraft is determined exclusively by the altimeter measurement, and the other two aircraft position coordinates are determined approximately by independent position sampling, which may use aircraft dead reckoning.

Evans et al, in U.S. Pat. No. 4,954,833, disclose a method for converting GPS-determined location coordinates, expressed in a natural coordinate frame involving geodetic azimuth, to a coordinate system involving astronomical azimuth. In U.S. Pat. No. 5,030,957, Evans discloses a method for simultaneously measuring height in two coordinate systems, orthometric and geometric, using GPS receiver antennas attached to the top of survey leveling rods.

U.S. Pat. No. 4,982,332, issued to Saito et al, discloses a road data generating system is disclosed for use in an on-board vehicle navigation system. Locations of points on roads on a map are determined and stored, by reference of each such point to a nearest road intersection based on location data sensed by the moving vehicle. These data are compared with any extant location data for that road, and extant data are replaced on the map by new data at a given location that are believed to be more accurate than the extant data near that location.

A method for compensating for errors in determination of location coordinates of a plurality of selected locations is disclosed by Soderberg et al in U.S. Pat. No. 4,982,504. One or more reference locations, whose coordinates are assumed to be known with high accuracy, are introduced. A location determination probe or tool is moved to one of these reference locations and location measurements are taken at location near to but displaced from the reference location(s) and compared with computed location coordinates for these locations displaced from the reference location. Errors found in these comparisons are used, in a manner not fully discussed by the inventor, to correct the measured location coordinates for other locations.

Dedieu et al, in U.S. Pat. No. 4,998,212, disclose a method of representing a geographical map as an assembly of curvilinear trapezoids that fit together along their common edges, in a manner that approximates sections that occur on a globe surface of the Earth. The map sections are deformed and rotated and fitted together to provide a representation of a region of interest.

In U.S. Pat. No. 5,001,647, Rapiejko et al disclose an inertial transformation matrix generator that generates a sequence of successive incremental Euler transformation matrices to follow the motion of a moving aircraft. Rate-sensing gyros, mounted on the housing of the craft, independently sense the motion of the craft in three mutually orthogonal directions. The present spatial orientation of the craft is periodically corrected by independent measurements made by an inertial navigation system mounted on the craft.

A map and text display system for aircraft navigation is disclosed by Factor et al in U.S. Pat. No. 5,057,835. The system stores terrain elevation information for regions adjacent to a flight path and compares the presently measured aircraft altitude with the maximum terrain elevation for the local region over which the aircraft is positioned, to determine if the aircraft altitude is above a safety threshold for that region. Aircraft latitude, longitude and altitude are determined conventionally, and no second source of aircraft altitude information is used to vary or improve the altitude estimate.

Moroto et al disclose a display system for a user of land vehicle or aircraft navigation apparatus, in U.S. Pat. No. 5,121,326. An on-board database contains map data for the local terrain, including roads, road intersections and selected landmarks, in a chosen location coordinate system. These map data are transformed to a display coordinate system that moves with the user and is visibly displayed on a screen for the user. The transformations include rotations and translations of the stored map data.

U.S. Pat. No. 5,128,684, issued to Brown, discloses use of a system of spaced apart sensors for correlating detected sensor events in space and time. These sensors may, for example, detect radar signals or echoes to determine target tracks of a radar target. Present angular locations and rates of change of angle, as sensed at each sensor, are correlated with each other using a trigonometric scoring function and assigning the moving target location to one of a plurality of fixed spatial bins with selected volumes.

A system for perspective display of part of a topographic map for a moving vehicle is disclosed in U.S. Pat. No. 5,161,886, issued to De Jong et al. The system uses coordinate transformations that create and display the region surrounding the present location of the vehicle on a chosen local surface, which moves with the vehicle. The direction of motion of the vehicle determines the orientation of the displayed portion of the map.

Curtin et al disclose a method for forming a composite terrain map from a mosaic of component images in U.S. Pat. No. 5,187,734. Digitized two-dimensional orthographic projections of the component images are formed, high-pass filtered and merged with a digitized, low-pass filtered overview map to form a composite map. Warping, using two-dimensional warping polynomials, is employed to map the component images onto a common set of spatial coordinates on a larger map.

Surveying satellite apparatus that compares sensor measurements with an on-board database to determine misorientation or translation errors is disclosed in U.S. Pat. No. 5,204,818, issued to Landecker et al. The database provides time-dependent upgrades for predicted reference locations, whose locations relative to the satellite change as the satellite moves across a region. The sensor measurements and upgrades can be transmitted to a ground-based user.

In U.S. Pat. No. 5,208,757, issued to Appriou et al, an on-board system for determination of the location of an airborne vessel, such as an aircraft, is disclosed. The spatial coordinates of discrete landmarks on the terrain below are entered into a computer memory. As the vessel flies over a landmark, the known location of this landmark is used to correct the location given by another navigation means that uses images of small portions of the terrain below for location determination. Kahnan filtering is applied to the location of the vessel relative to the terrain.

Hong et al, in U.S. Pat. No. 5,208,763, disclose a system for determining location and orientation of a workpiece, using location sensors installed on a machine that handles and processes the workpiece. Location coordinates of selected points on surfaces of the workpiece are measured. A geometric transformation, involving only translations and rotations, is determined, with transformation parameters that are chosen to minimize a mean square error function, depending on the squares of the distances from each selected points to locations of that selected points under the geometric transformation. A similar approach, where the workpiece is an excavator blade used for construction work, is disclosed by Awano et al in U.S. Pat. No. 5,363,304.

An interactive automated mapping system that uses location information determined using a GPS is disclosed by Mauney et al in U.S. Pat. No. 5,214,757. Attributes related to location information can be entered, stored and subsequently displayed. The system creates new maps and/or annotates existing maps but does not provide reconciliation between an existing map and a new map.

U.S. Pat. No. 5,271,066, issued to Leonard, discloses apparatus for determining two-dimensional spatial coordinates on a map, using a viewing mechanism that allows scanning and digitization of designated points on the underlying map. An associated scanner can be rotated relative to the underlying map. Another rotatable scanner for capture of image data is disclosed by Faust et al in U.S. Pat. No. 5,280,370.

Interpolation image processing of a digital map is employed to determine pixel color is disclosed in U.S. Pat. No. 5,299,300, issued to Femal et al. Interpolation of pixel color or related data, for a plurality of pixels with spatial locations adjacent to the spatial location of a target pixel, is used to compute to compute the pixel data for the target pixel.

In U.S. Pat. No. 5,321,797, issued to Morton, a system for performing coordinate transformations using stored data is disclosed that interpolates between stored transformed coordinate to determine a suitable transformation for the present location of a user. The quantized and stored location coordinate transformations may be nonlinear functions of selected input variables, such as angles. Input variables are selected by linear interpolation to produce output location coordinates that approximate the user's present location.

Bormans, in U.S. Pat. No. 5,325,482, discloses a system for adding new network data to an existing electronic map, stored in memory. A new map, containing only the new data, is superimposed on the existing map, and corresponding reference points on each map are incrementally moved until they coincide. A third electronic map is then prepared, combining the existing map features with the new data features. Interpolation of reference point locations is sometimes performed.

A system for correcting a compass heading for a vehicle is disclosed in U.S. Pat. No. 5,339,246, issued to Kao. Two or more magnetic compass heading readings are sensed, and a GPS-determined compensation factor is computed to adjust a magnetic heading value to a true heading as indicated by the GPS. The magnetic compass heading and GPS heading values are referenced to a single map.

Wescott et al disclose a polygon-based map display system in U.S. Pat. No. 5,341,463. The system user selects any map center, and a database is used to geometrically describe and display nearby land and water areas as polygons with an arbitrary number of vertices. Calculation of latitude and longitude coordinates for any point on the map are asserted to be determined directly, without requiring any inverse transformations between coordinate systems.

A relative aircraft guidance system using GPS signals is disclosed by Youhannaie in U.S. Pat. No. 5,344,105. First and second airborne vehicles, positioned close together, each carry a GPS antenna and receiver/processor and receives GPS signals from the same group of GPS satellites. Using a selected GPS satellite constellation, the first vehicle locates a target, converts the target location to a reference frame of the selected satellite constellation, and communicates the target location in this reference frame and identity of the selected satellite constellation to the second vehicle, for guidance purposes.

In U.S. Pat. No. 5,345,086, Bertram discloses an automatic map compilation system that extracts three-dimensional surveying or similar information from a plurality of two-dimensional maps. A pair of stereoscopic maps, showing data on terrain and/or associated altitude(s), is scanned into a computer, and altitudes for topographic sections are determined, if desired. An orthographic image projection is prepared from the scanned-in data and may be displayed as a photograph or orthophoto. Three-dimensional coordinates of a point are determined two or more from two-dimensional views.

These patents usually assume that the coordinates for locations of interest in a coordinate system, or in two or more associated coordinate systems, are consistent with each other. Further, the computations and coordinate manipulations are usually performed in a post-processing environment, rather than in a real time environment in the field at the time the survey measurements are made. What is needed is an approach that allows real time processing, preferably at a time contemporaneous with the survey in the field, to optionally determine any adjustments in location coordinates required to reconcile location coordinates for different survey locations with each other. Preferably, two or more approaches for these coordinate adjustments should be available so that a selection of approach can be made based upon the desired accuracy and/or the particular constraints that are present.

SUMMARY OF THE INVENTION

These needs are met by the invention, which provides method and apparatus for selecting an optimal transformation between a first ellipsoid E1 (e.g., WGS 84) in a global, rectangular coordinate system G1, relative to which the survey measurements are made, and a first local coordinate system S1 or second local coordinate system S2, in which survey location coordinates are more conveniently expressed, recorded and/or presented (G1→S1, or G1→S2). This approach allows an optimal matching of many location coordinates for previously-surveyed locations and of contemporaneously-determined location coordinates for new survey locations. Optionally, an intermediate local coordinate system S3 can be provided for a different mapping path (G1→S3→S1). A transformation between the local coordinate system S1 and the coordinate system S2 or S3 is determined and optimized to match, as nearly as possible, the plurality of location coordinates for the previously-surveyed and contemporaneously-surveyed locations.

Survey measurements of a set of selected locations may have been made in a second global rectangular coordinate system G2 (e.g., NAD 83), and survey measurements on these selected locations may be subsequently made in the first global coordinate system E1. A linear transformation T(G2;G1) is defined of the first ellipsoid E1 into the second ellipsoid E2, and the transformation T(G2;G1) is optimized by requiring that the images in E2 of these selected locations in E1 under the transformation T(G2;G1) be as close as possible, in some sense, to the corresponding previously-surveyed selected locations in or near E2.

Given a previously-surveyed set of locations, a locally optimal surface $\Sigma$ can be found for which these corresponding previously-surveyed locations are as close as possible, in some sense, to the surface $\Sigma$. A set of survey location coordinates $\{(x_i,y_i,z_i)\}$ can be used to choose a surface $z=z(x,y)$ that approximates the surface $\Sigma$ as closely as desired.

Given an ellipsoid, such as E1 or E2, and a selected survey plane $\pi 0$ that is tangent to the ellipsoid at a selected location, a set of selected locations can be surveyed with reference to the ellipsoid, and the location coordinates of each such surveyed location can be mapped into a corresponding "survey location," defined by reference to a local coordinate system that uses the survey plane $\pi 0$ as its base.

All these determinations of transformations and mappings and of corresponding survey locations can be made in the field in near-real time, or these determinations can be made by post-processing after the survey crew returns to the office. The invention will be most useful for in-the-field determinations, where errors in measurement, or in assumptions concerning a local coordinate system used for such measurements, can be promptly corrected if necessary.

DESCRIPTION OF PREFERRED EMBODIMENTS

Figure 1:
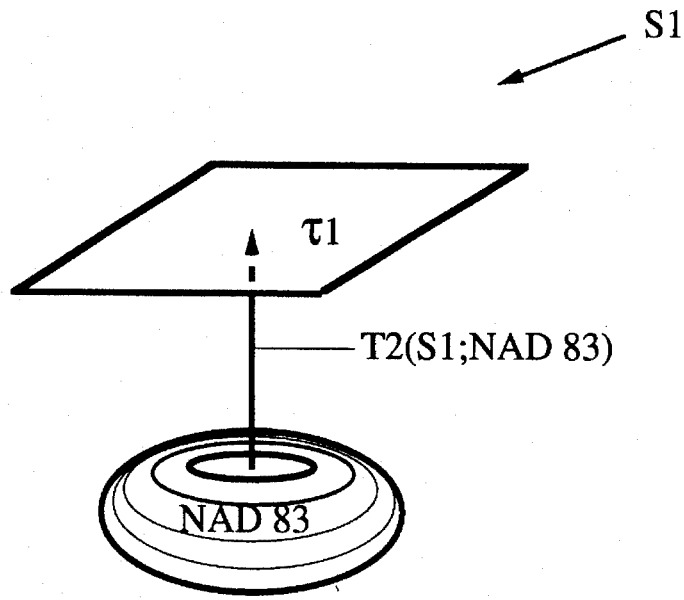
FIG. 1 illustrates mapping of survey location coordinates, from a pre-GPS ellipsoid, such as NAD 83, to a local three-dimensional coordinate system S1, before GPS-assisted mapping became available.

FIG. 1 illustrates mapping of survey location coordinates before GPS-assisted surveying became available. A survey team, usually including two or more persons, each of whom carried a portion of the survey equipment, would locate a local survey monument whose location coordinates were known. Using the local monument as a reference point, the team would make survey measurements in the field in a survey coordinate system such as NAD 27 or NAD 83, using an oblate or prolate ellipsoid whose dimensions were fixed in that coordinate system. The NAD 83 ellipsoid (and associated survey coordinate system), developed in 1983, is a more recent version of the older NAD 27 ellipsoid, developed in 1927, and is discussed below. The NAD 83 survey coordinates would then be transformed or projected into a local three-dimensional coordinate system S1 by a coordinate transformation indicated as T2(S1;NAD83). Here, the first variable S1 indicates the destination and the second variable NAD83 indicates the source for the location coordinates. The local coordinate system S1 is three-dimensional and involves orthogonal horizontal coordinates ("Northing" and "Easting" in some regions of the world, "Southing" and "Westing" in other regions), measured in a tangent plane $\tau 1$ having a specified survey center SC, and a vertical coordinate, "Height," measured in a direction perpendicular to the tangent plane $\tau 1$. A "projection," as used here, is a mathematical means for transferring geographical and related information from a curved surface, such as an ellipsoid used to represent the Earth's surface, into or onto another two-dimensional surface, such as a plane, cylindrical surface or conical surface.

Figure 2:
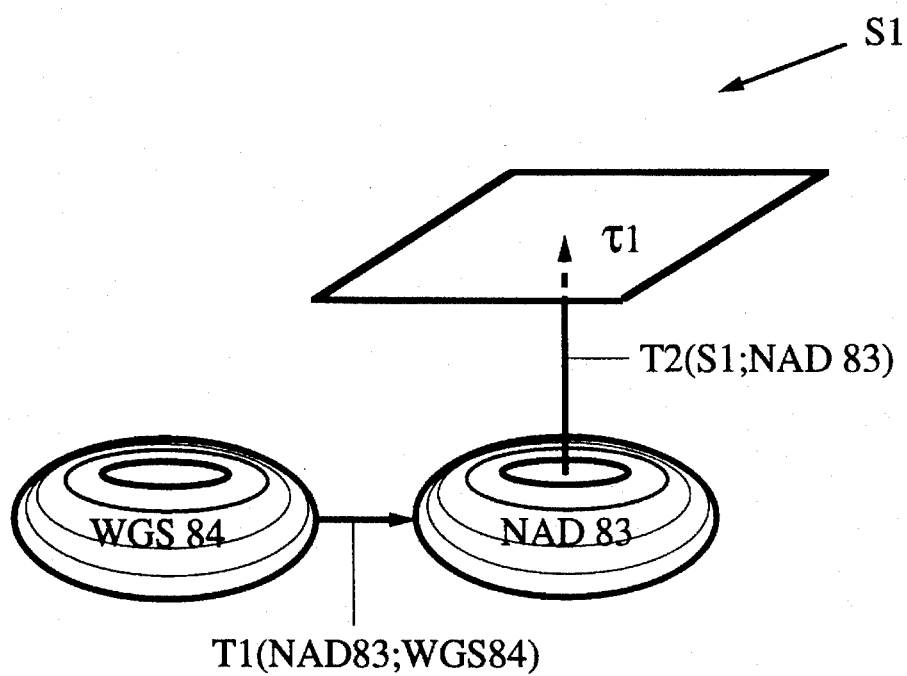
FIG. 2 illustrates mapping of survey location coordinates in the prior art, from a WGS 84 ellipsoid to a pre-GPS ellipsoid, such as NAD 83, to a local three-dimensional coordinate system S1, after GPS-assisted surveying became available.

FIG. 2 illustrates mapping of survey location coordinates in the prior art after GPS-assisted surveying became available. Survey location coordinates are first obtained using the WGS 84 ellipsoid, which is discussed below and has parameters close to the corresponding parameters of another survey ellipsoid. The NAD 83 ellipsoid is used here as an example of this other ellipsoid; any other ellipsoid that approximately matches the Earth's surface can be used here. In one approach, these survey location coordinates are mapped into NAD 83 location coordinates, using a first transformation T1(NAD83;WGS84), and the NAD 83 location coordinates are then mapped into the local coordinate system S1 using a second transformation T2(S1;NAD83).

Figure 3:
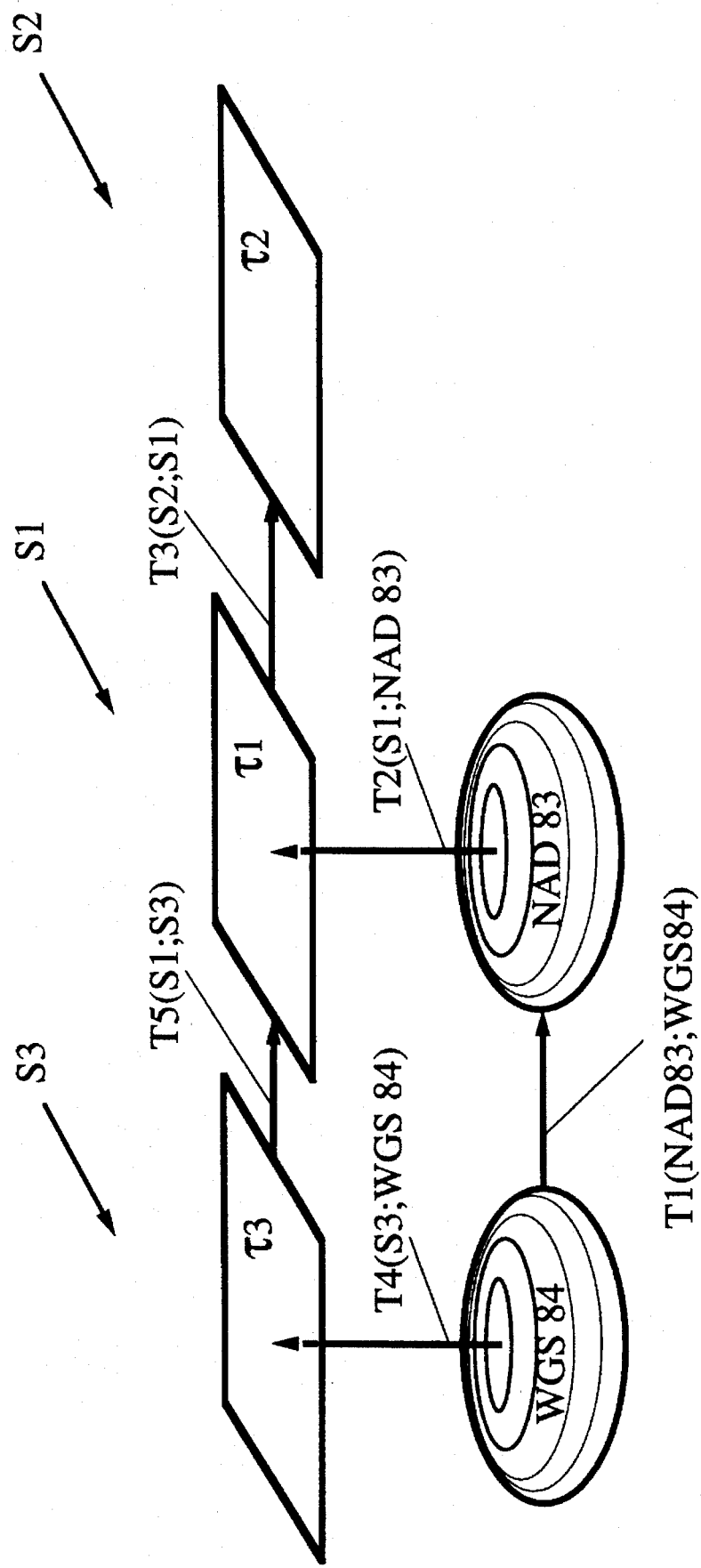
FIG. 3 illustrates mapping of survey location coordinates according to several embodiments of the invention, from the WGS 84 system to the system $\pi 1$ by two different routes, and from the system S1 to a similar three-dimensional coordinate system S2.

FIG. 3 illustrates several embodiments of the invention. In a first embodiment, the sequence of transformations T1(NAD83;WGS84) and T2(S1;NAD83) shown in FIG. 2 is concatenated with a third transformation T3(S2;S1) that maps the location coordinates in the first local coordinate system S1 into a local second three-dimensional coordinate system S2 that has a structure that is qualitatively similar to the structure of S1. For example, the coordinates used in the second coordinate system S2 might use LATitude, LONgitude and ALTitude for the three coordinates, or some other similar three-dimensional coordinate system.

In another embodiment, the "original" survey location coordinates associated with the WGS 84 ellipsoid are first mapped into a local third three-dimensional coordinate system S3 (similar in structure to the system S1), using a fourth transformation T4(S3;WGS84). The location coordinates in the system S3 are then mapped into location coordinates in the system S1, using a fifth transformation T5(S1;S3), in such a manner that any location L with location coordinates $(x_1,y_1,z_1)$ in the WGS 84 system satisfies the requirement that $$T5(S1;S3)[T4(S3;WGS84)(x_1,y_1,z_1)]=T2(NS1;NAD83)[T1(NAD83;WGS84)(x_1,y_1,z_1)]. \quad (1)$$

That is, the location coordinates of the image of L under the concatenated transformations T4·T3 are the same as the location coordinates of the image of L under the concatenated transformations T2·T1 (or approximately so, with controllable maximum inaccuracy over some bounded region in the original coordinate system WGS 84). If T4 is invertible, T5 is expressed as $T5=T2 \cdot T1 \cdot T4^{-1}$, and Eq. (1) is formally exact.

Figure 4:
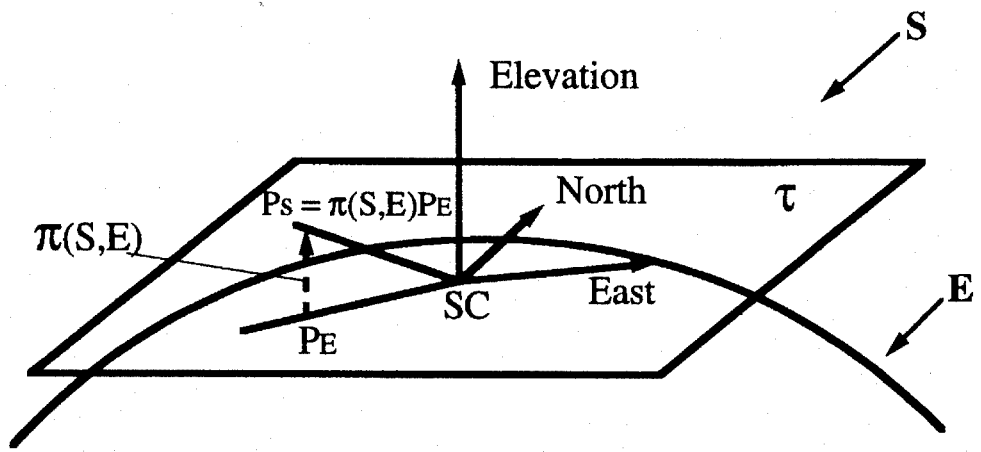
FIG. 4 illustrates a relationship between an ellipsoid-based, global first coordinate system E1 and a local second coordinate system S in which location coordinates are expressed, stored and/or presented.

The invention allows a surveyor, in the field or in the office, as desired, to choose and optimize geometric parameters for a location coordinate transformation between a global coordinate system G based on an ellipsoid surface E, such as WGS 84 or NAD 83 or NAD 27, used for taking and/or analyzing measurements in an SATPS-assisted survey of locations, and one or more local coordinate systems S(=S1, S2 or S3), in which the location coordinates are more conveniently expressed, stored and/or presented. With reference to FIG. 4, a survey is performed relative to a chosen survey center SC (an "origin") on or near the Earth's surface, where the survey center SC may be a monument or landmark whose location has been previously surveyed and is known with great accuracy. The local coordinate system S will often use a local tangent plane τ or other developable surface and will define two of the three coordinates in the system S with reference to the surface τ and the origin SC. The coordinates of one or more locations surveyed are often expressed in a first local coordinate system (S1 in FIGS. 1, 2 and 3) in a form (Northing, Easting, Height) or (Southing, Westing, Height) relative to the selected origin SC.

The horizontal coordinates $(x_{1,S},y_{1,S})$ in the local coordinate system S are often determined by projection π(S,E) of a location L with location coordinates $(x_{1,E},y_{1,E},z_{1,E})$, measured with reference to the NAD 83 or WGS 84 ellipsoid surface E, onto a tangent plane τ, using a (unique) line drawn normal or perpendicular to the ellipsoid surface E that passes through the given location L, as illustrated in FIG. 4. Thus, for example, the point or location $P_E$ in the global coordinate system G becomes the point or location $P_S=\pi(S,E)P_E$ in the local coordinate system S under the projection π(S,E).

The projection π(S,G) front the global, ellipsoid-based coordinate system G to the local coordinate system S may be any of several such projections, including Mercator, transverse Mercator, oblique Mercator, Lambert conformal conic, rectified skew orthomorphic, polar stereographic, oblique stereographic, Cassini and New Zealand map grid. These projections are discussed in great detail by John P. Snyder, *Map Projections—A Working Manual*, U.S. Geological Survey Professional Paper 1395, U.S. Government Printing Office, 1987. This list does not exhaust the possible projections, and the invention may be implemented using any suitable projection system.

Three types of local three-dimensional coordinate systems can be used here: (1) Cartesian, including three mutually orthogonal coordinate axes with fixed directions; use of this coordinate system does not require specification of any particular ellipsoid as a representative of the Earth's surface or a parallel surface; (2) geographic or ellipsoidal, in which the three coordinates are LATitude, LONgitude and ALTitude above or below an ellipsoid surface; use of this coordinate system requires specification of the datum parameters; and (3) projected, in which any location on or adjacent to the ellipsoid is projected onto a specified planar, cylindrical or conical surface, using projectors that are locally perpendicular to that surface.

Figure 5:
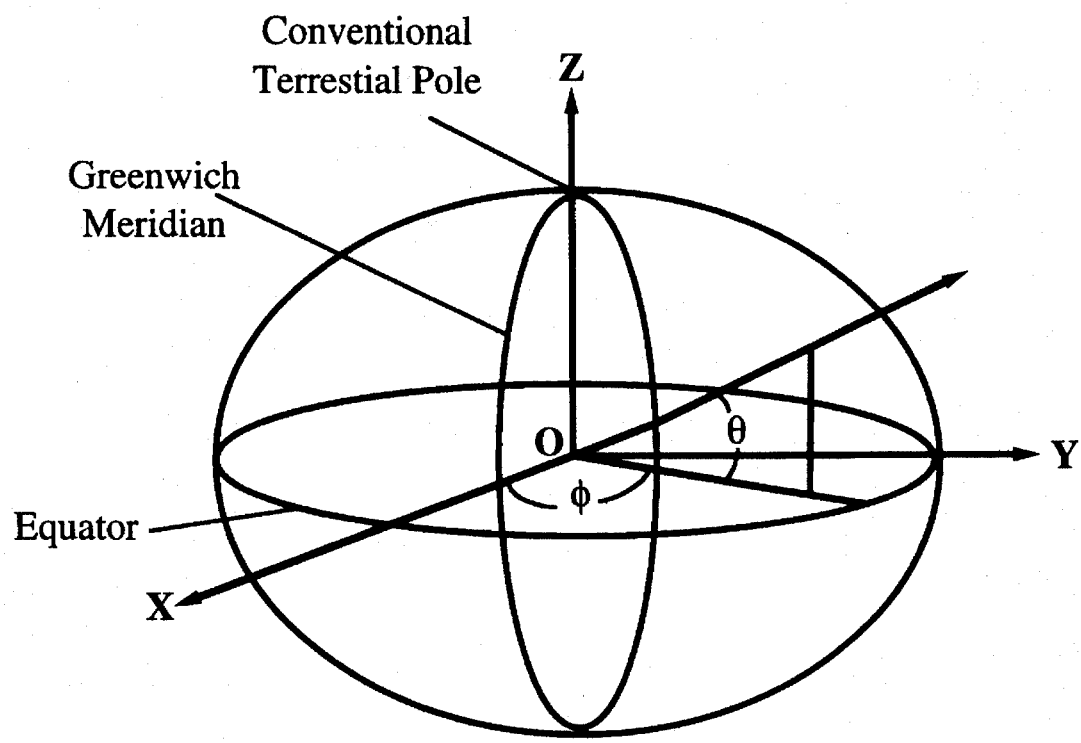
FIG. 5 illustrates coordinatization of the surface of an ellipsoid, using azimuthal and polar angles and a variable radial distance.

At most 12 parameters, including three ellipsoid origin coordinates (translated from a fixed origin O), three orientation angles for the ellipsoid, three scale factors, and three ellipsoid diameters measured along the principal axes of the ellipsoid, determine a datum associated with an ellipsoid. In the WGS 84 and NAD 83 coordinate systems, the ellipsoid E is oblate, with known principal axis diameters being (2a,2a,2b), with 0<b<a; as few as seven parameters suffice in one embodiment, and as few as five parameters suffice in another embodiment, the Molodensky transformation. The coordinate system origin used for WGS 84 and for NAD 83 is the geometric center of the ellipsoid E, and the primary axes coincide with the usual Cartesian coordinate axes x, y and z. FIG. 5 illustrates coordinatization of the WGS 84 or NAD 83 ellipsoid E, using an azimuthal angle φ, a polar angle θ, and a third radial coordinate r defined by $$r=r(\theta)=[\cos^2\theta/a^2+\sin^2\theta/b^2]^{-\frac{1}{2}}. \quad (2)$$

Figure 6:
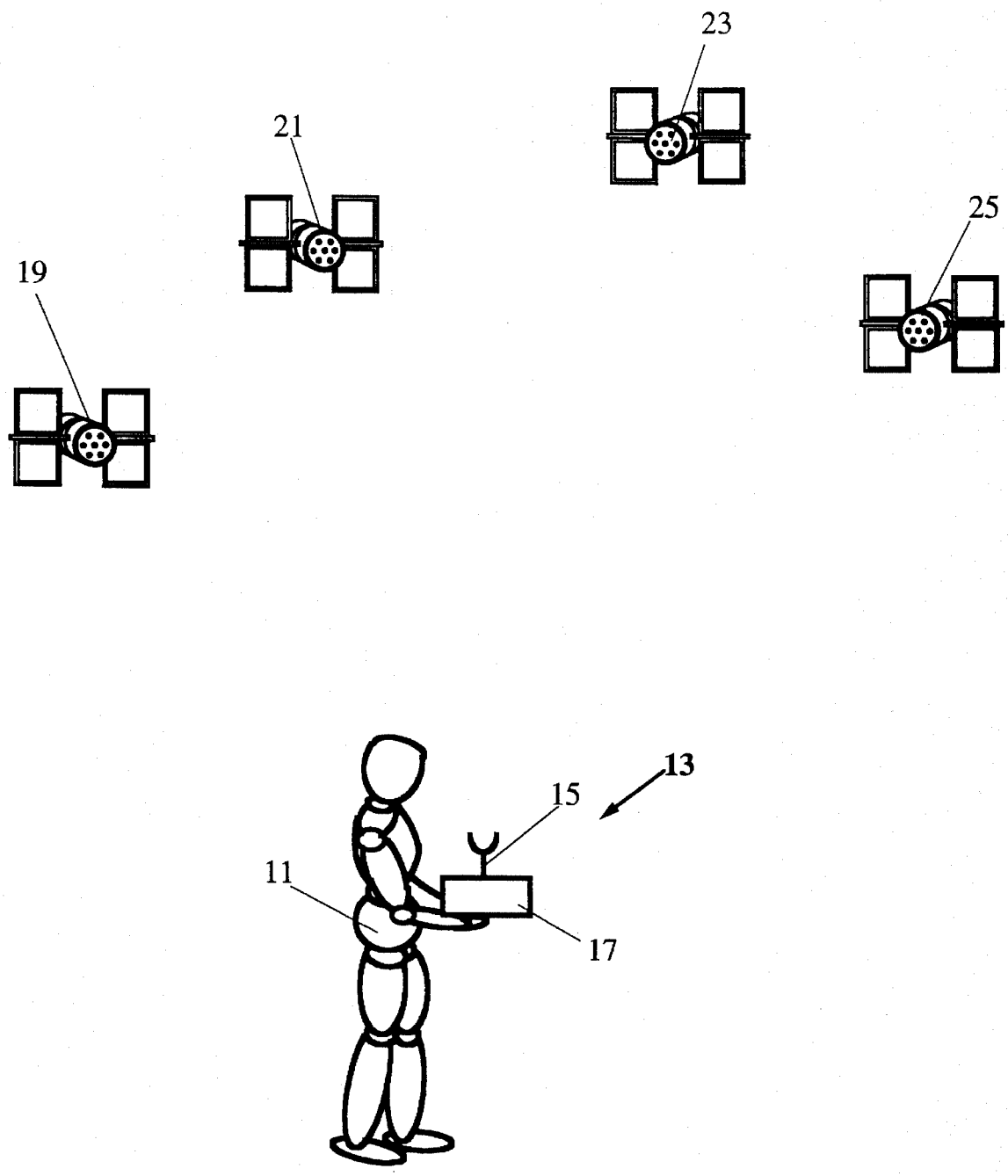
FIG. 6 illustrates receipt of Satellite Positioning System (SATPS) signals in a WGS 84 system for location measurement purposes.

As illustrated in FIG. 6, a surveyor or surveyor vehicle 11 carries an SATPS location determination module 13 that includes an SATPS signal antenna 15 and associated SATPS signal receiver/processor 17 that receive and process SATPS signals from three or more SATPS satellites 19, 21, 23, 25. The SATPS may be a Global Positioning System (GPS), a Global Orbiting Navigation Satellite System (GLONASS), an ORBCOMM system, or a similar satellite-based location determination system. The SATPS receiver/processor 17 receives these signals and, using analysis of the code phase signals or the carrier phase signals, or both, initially determines the location coordinates of the SATPS antenna 15 in a special coordinate system, usually the WGS 84 datum or the nearly-equivalent NAD 83 datum, which are discussed by Alfred Leick in *GPS Satellite Surveying*, John Wiley & Sons, New York, Second Edition, 1995, pp. 215–232, 410–429 and 486–499. The information in this material is incorporated by reference herein.

If the ephemeris data and corrections broadcast for SATPS satellites are used for computing location coordinates directly, SATPS locations and vectors representing these locations can be referenced to the WGS 84 datum, which provides a global coordinate system G. The WGS 84 datum begins with a two-dimensional surface of an ellipsoid or geoid that approximates the Earth's surface but is continuously differentiable so that a surface normal is defined and is continuous everywhere on the surface. The direction of the local surface normal is approximately parallel to the local direction of total gravity (normal gravity plus the centrifugal effect of the Earth's rotation about its rotational axis). The particular geoid chosen here is a "best fit" in some minimum error sense to average sea level on the Earth. This surface has some bulges inward and outward, especially near mountain ranges, and cannot be accurately defined mathematically by any finite series of terms. This geoid is, therefore, approximated by an oblate ellipsoid of revolution, whose minor axis is parallel to the Earth's rotational axis. This ellipsoid, referred to as the WGS 84 ellipsoid E1 here for convenient reference, is slightly flattened at its poles relative to the ellipsoid's equator, reflecting the Earth's polar flattening due to rotation and other phenomena. The WGS 84 ellipsoid has a semimajor axis length a, semiminor axis length b and flattening factor f related by $$a=6378.137 \text{ km} \quad (3)$$

$$f=(a-b)/a=(298.257223563)^{-1}. \quad (4)$$

The ellipsoid E2 adopted by the NAD 83 datum, which is used primarily for civil surveying activities, has the same semimajor axis length as the WGS 84 ellipsoid but has a slightly different flattening factor, $f=(298.257222101)^{-1}$.

This geoid surface may also be approximately defined by a geopotential surface involving a finite sum of spherical harmonic terms, as discussed by R. H. Rapp and N. K. Pavlis, "The Development and Analysis of Geopotential Coefficient Models to Spherical Harmonic Degree 360," Jour. of Geophysical Research, vol. 95 (1990) 21885–21911 and in papers cited therein.

A surveyor working in the field will often record survey locations in a local coordinate system S1 in which the location coordinates are (Northing, Easting, Height). A local coordinate system S1 is only locally defined, because vectors representing the "Northing", "Easting" and/or "Height" directions will vary with a meridional angular coordinate, such as longitude, and with the distance of the origin O from the equator (measured by latitude). A second local coordinate system S2, such as one that provides location coordinates in (LATitude, LONgitude, ALTitude), may also be introduced and used to express, record and/or store the survey data.

Use of a local coordinate system S1 (or S2 or S3), and relation of this coordinate system to a global coordinate system G, can introduce several sources of error into the survey measurements and their interpretation, including the following errors: (1) projections between a point $P_E$ on an ellipsoid E(=E1 or E2), upward or downward to a point $P_{S1}=\pi(S1,E)P_E$ onto another two-dimensional surface S1, such as a plane τ that is locally tangent to the Earth's surface, introduces errors that accumulate as the distance between the survey center SC and the point PE increases; (2) the locations of local monuments or landmarks on the Earth's surface used for reference in the survey may have their own associated errors in the coordinate system S1, and this may introduce inconsistencies in other nearby locations; (3) a three-parameter, five-parameter, seven-parameter or 12-parameter datum transformation between the ellipsoid E, used to approximate the Earth's surface, and the local coordinate system S1 (or S2 or S3) may introduce its own transformation errors in height adjustment and related measurements; and (4) accumulated errors in survey locations may preclude achievement of centimeter-level accuracy in most of the measurements made to determine the location coordinates in S1. In practice, some of these errors are often removed or minimized by adjustment of the location coordinates and datum parameters in post-processing performed elsewhere and/or later, using various techniques. This practice does not allow development or use of standards for optimization or allow rapid, in-the-field determination, inspection and/or correction of the results of such adjustments. The invention provides approaches for in-the-field, near-real-time adjustment and optimization (or in-the-office adjustment and optimization) of transformation parameters and of reference location coordinates and for prompt display and inspection of the results of such adjustment and optimization.

The invention is not limited to transformation between an ellipsoid surface and a planar surface. Transformation between a first curved surface and a second curved surface, such as a cylindrical or conical surface, or between first and second ellipsoidal surfaces, is also covered by this invention, as indicated in the accompanying discussion Presently, an adjustment of location coordinates in an associated coordinate system can be made using a local survey center, such as an origin O', and the location coordinates in S1 of an additional surveyed point $P_{1,E}$ with all rotations and coordinate scale transformations being chosen so that the location coordinates of the points SC and $P_{1,E}$ are correct. In the most general case, this might require (1) a translation, (2) a rotation, (3) a scale transformation (expansion or contraction) and/or (4) coordinate inversion relative to a selected origin of this system. If the location coordinates of one or more additional points $P_{n,E}$ (n=2, 3, . . . , N; N≧2) were determined in a previous survey and are also determined in the present survey, the location coordinates for each of these other N−1 survey locations may have associated location errors that are usually non-optimal and may be cumulative. Height adjustment of the additional surveyed locations may or may not be provided or required.

One approach provided by the invention recalibrates or redetermines the location coordinates of all N survey locations in S1, including $P_{1,E}$, using least pth power minimization (preferably with p=2) of a sum of pth powers of differences, or another optimization technique, with uniform or non-uniform weighting of the pth power components in the sum. Proceeding in this manner, closing error or other accumulating error is redistributed over all the survey locations in a manner that is optimal for a given choice of the weighting coefficients and is not dependent upon the order in which these locations are or were surveyed. This approach allows use of location coordinates of previously-surveyed locations, with or without resurveying these previously-surveyed locations, and use of location coordinates for "new" locations that were not previously surveyed. Assuming that differential corrections of carrier phase measurements are used, real time kinematic (RTK) determination of survey locations can be achieved, with cm-level accuracy and with the results being optionally displayed and analyzed and corrected in the field as the survey progresses.

Let T1(G2;G1) be an invertible transformation of location coordinates from an ellipsoid E1 in a first global coordinate system G1 to an ellipsoid E2 in a second global coordinate system G2. Here, E1 and E2 may be the WGS 84 and NAD 83 ellipsoids, respectively. Let T2(S1;G2) be an invertible transformation from the ellipsoid E2 in G2 to the local coordinate system S1. The transformation T1 carries a location coordinate triple ($x_{E1}$, $y_{E1}$, $z_{E1}$), representing a location or point in or near E1, into a location coordinate triple $(x_{E2}, y_{E2}, z_{E2})$, representing a point or location in or near E2. The transformation T2 carries a location coordinate triple $(x_{E2}, y_{E2}, z_{E2})$, representing a location or point in or near E2, into a location coordinate triple $(x_{S1}, y_{S1}, z_{S1})$, representing a point or location in S1.

One begins with M survey locations (M≥3) in a region R for which previously-determined location coordinates $(x'_{i,E2}, y'_{i,E2}, z'_{i,E2})$ (i=1, ..., M) are already known in the coordinate system G2, using (Northing, Easting, Height) coordinates or some other choice of coordinates. Location coordinates $(x'_{i,E1}, y'_{i,E1}, z'_{i,E1})$ (i=1, ..., N; N≥M) for N survey locations are determined with reference to E1, using presently-made SATPS measurements. The number M of already-surveyed locations (with corresponding location coordinates $(x'_{i,E2}, y'_{i,E2}, z'_{i,E2})$) is not limited, nor is the total number N of previously-surveyed locations limited. The set of M previously-surveyed locations is part of the set of N presently-surveyed locations.

Adjusted or transformed location coordinates $(x''_{i,E2}, y''_{i,E2}, z''_{i,E2})$ (i=1, ..., N), defined by a transformation with L (L≥1) parameters of the location coordinates $(x'_{i,E1}, y'_{i,E1}, z'_{i,E1})$ in the coordinate system G1 into the coordinate system G2, are chosen that minimize an error sum $$\epsilon_p = \sum_{i=1}^{M} \{e_i|x''_{i,E2} - x'_{i,E2}|^p + f_i|y''_{i,E2} - y'_{i,E2}|^p + g_i|z''_{i,E2} - z'_{i,E2}|^p\}(1/p), \quad (5)$$

where the coefficients $e_i$, $f_i$ and $g_i$ are selected non-negative weighting numbers, which may be uniform (all equal) or may be non-uniform, and p is a selected positive real number. The choice of exponent p=2 for a minimum least squares optimization can be made here for computational convenience. As the exponent p is increased to higher and higher values, the result of minimization of $e_p$ will be primarily to decrease the values of the largest terms $|X''_{i,E2} - X'_{i,E2}|^p$ (X=x, y or z) in the sum in Eq. (5). After the adjusted location coordinates $(x''_{i,E2}, y''_{i,E2}, z''_{i,E2})$ (i=1, ..., N) are determined, the corresponding coordinates $(x'_{i,E1}, y'_{i,E1}, z'_{i,E1})$ may replace the original survey coordinates for the already-surveyed locations, or the new survey location coordinates $(x''_{i,E2}, y''_{i,E2}, z''_{i,E2})$ may be used.

The adjustment or transformation of coordinates in the coordinate system G1 is implemented by an invertible linear location coordinate transformation T1 in three dimensions between location coordinates $(x_{E1}, y_{E1}, z_{E1})$ in G1 and location coordinates $(x''_{E2}, y''_{E2}, z''_{E2})$ in the coordinate system G2. The transformation T1 includes translations, rotations, scale transformations and inversions and is expressible as an at-most 12-parameter transformation $$x''_{E2} = h_{11}x'_{E1} + h_{12}y'_{E1} + h_{13}z'_{E1} + h_{14}, \quad (6)$$

$$y''_{E2} = h_{21}x'_{E1} + h_{22}y'_{E1} + h_{23}z'_{E1} + h_{24}, \quad (7)$$

$$z''_{E2} = h_{31}x'_{E1} + h_{32}y'_{E1} + h_{33}z'_{E1} + h_{34}, \quad (8)$$

where the real number constants $h_{ij}$ (i=1,2,3; j=1,2,3,4) are regarded as adjustable parameters in the transformation T1. Because this transformation is required to be invertible, the determinant value of the 3×3 matrix $(h_{ij})$ (i=1,2,3; j=1,2,3) is not zero and is preferably near +1. If $\det(h_{ij}) \neq \pm 1$, the transformation T1 includes a non-trivial scale transformation that may be different spatial in different directions. The transformation T1 is a volume expansion if $|\det(h_{ij})|>1$ and is a volume contraction if $|\det(h_{ij})|<1$. The transformation T1 can involve a coordinate inversion if $\det(h_{ij})$ is negative and near −1, with the associated scale expansion or scale contraction. The three parameters $h_{i4}$ (i=1,2,3) are interpretable as translation parameters, not involving any scale expansion or scale contraction.

For computational convenience, the parameter p used in the sum in Eq. (5) is chosen to be p=2 here. Any other positive real number can be used for p, but the computations will be somewhat more complex because of presence of the absolute value operators in Eq. (5).

Beginning with the SATPS-assisted measurements of the coordinates $(x'_{i,E1}, y'_{i,E1}, z'_{i,E1})$ in G1, the linear transformation T1 in Eqs. (6), (7) and (8) is applied to produce adjusted coordinates $(x''_{i,E2}, y''_{i,E2}, z''_{i,E2})$ in G2. The error sum $\epsilon_2$ (or, more generally, $\epsilon_p$) in Eq. (5) is computed and minimized with respect to choices of the 12 parameters $h_{ij}$ (i=1,2,3; j=1,2,3,4), by computing the indicated partial derivatives and requiring that $$\partial \epsilon_2 / \partial h_{ij} = 0, \quad (9)$$

for each of the 12 parameters that define the linear transformation T1.

Equations (9) divide naturally into three sets of four linear equations each that can be expressed in matrix form as $$\begin{bmatrix} \Sigma x'_{i,1} x'_{i,1} & \Sigma x'_{i,1} y'_{i,1} & \Sigma x'_{i,1} z'_{i,1} & \Sigma x'_{i,1} \\ \Sigma y'_{i,1} x'_{i,1} & \Sigma y'_{i,1} y'_{i,1} & \Sigma y'_{i,1} z'_{i,1} & \Sigma y'_{i,1} \\ \Sigma z'_{i,1} x'_{i,1} & \Sigma z'_{i,1} y'_{i,1} & \Sigma z'_{i,1} z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{11} \\ h_{12} \\ h_{13} \\ h_{14} \end{bmatrix} = \begin{bmatrix} \Sigma x'_{i,1} x'_{i,2} \\ \Sigma y'_{i,1} x'_{i,2} \\ \Sigma z'_{i,1} x'_{i,2} \\ \Sigma x'_{i,2} \end{bmatrix}, \quad (10)$$

$$\begin{bmatrix} \Sigma x'_{i,1} x'_{i,1} & \Sigma x'_{i,1} y'_{i,1} & \Sigma x'_{i,1} z'_{i,1} & \Sigma x'_{i,1} \\ \Sigma y'_{i,1} x'_{i,1} & \Sigma y'_{i,1} y'_{i,1} & \Sigma y'_{i,1} z'_{i,1} & \Sigma y'_{i,1} \\ \Sigma z'_{i,1} x'_{i,1} & \Sigma z'_{i,1} y'_{i,1} & \Sigma z'_{i,1} z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{21} \\ h_{22} \\ h_{23} \\ h_{24} \end{bmatrix} = \begin{bmatrix} \Sigma x'_{i,1} y'_{i,2} \\ \Sigma y'_{i,1} y'_{i,2} \\ \Sigma z'_{i,1} y'_{i,2} \\ \Sigma y'_{i,2} \end{bmatrix}, \quad (11)$$

$$\begin{bmatrix} \Sigma x'_{i,1} x'_{i,1} & \Sigma x'_{i,1} y'_{i,1} & \Sigma x'_{i,1} z'_{i,1} & \Sigma x'_{i,1} \\ \Sigma y'_{i,1} x'_{i,1} & \Sigma y'_{i,1} y'_{i,1} & \Sigma y'_{i,1} z'_{i,1} & \Sigma y'_{i,1} \\ \Sigma z'_{i,1} x'_{i,1} & \Sigma z'_{i,1} y'_{i,1} & \Sigma z'_{i,1} z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{31} \\ h_{32} \\ h_{33} \\ h_{34} \end{bmatrix} = \begin{bmatrix} \Sigma x'_{i,1} z'_{i,2} \\ \Sigma y'_{i,1} z'_{i,2} \\ \Sigma z'_{i,1} z'_{i,2} \\ \Sigma z'_{i,2} \end{bmatrix}, \quad (12)$$

where $x'_{i,1}$, $y'_{i,1}$, $z'_{i,1}$, $x'_{i,2}$, $y'_{i,2}$ and $z'_{i,2}$ are abbreviations for the respective quantities $x'_{i,E1}$, $y'_{i,E1}$, $z'_{i,E1}$, $x'_{i,E2}$, $y'_{i,E2}$ and $z'_{i,E2}$, and where each sum, such as $\Sigma x'_{i,1} y'_{i,1}$ and $\Sigma x'_{i,1} z'_{i,2}$, is a sum over the indicated location coordinates corresponding to the M already-surveyed points (i=1, 2, ..., M) whose location coordinates $(x'_{i,E2}, y'_{i,E2}, z'_{i,E2})$ are already known in G2.

Equations (10), (11) and (12) can be expressed more succinctly in the form $$W h_k = J_k \quad (k=1,2,3), \tag{13}$$

where W is the same 4×4 matrix on the left in each of Eqs. (10), (11) and (12), $h_k$ is the 4×1 column matrix $[h_{k1} h_{k2} h_{k3} h_{k4}]^{tr}$ and $J_k$ is the corresponding 4×1 column matrix on the right in Eqs. (10), (11) and (12) for k=1,2,3. The matrix W is assumed to be invertible here so that the solution vectors $h_k$ are given by the relations $$h_k = W^{-1} J_k \quad (k=1,2,3). \tag{14}$$

After the solution vectors $h_k$ are determined, the adjusted location coordinates $(x''_{i,E2}, y''_{i,E2}, z''_{i,E2})$ (i=M+1, ..., N) for the remaining, newly-surveyed locations can be determined in the coordinate system G2, using Eqs. (6), (7) and (8), for further analysis, correction, display and/or recording for future reference. Equations (10)–(12) can be applied each time a survey is completed, to obtain sequential improvement of survey results. Because all coordinate adjustments are determined together, the adjustments are independent of the order of surveying of the locations.

The transformation T1 in Eqs. (6)–(8) may be interpreted as a mapping of one ellipsoid surface or other curved surface onto another. If the number of already-surveyed locations M is at least 4, as many as M-3 3 suspect or bogus coordinates can be identified and deleted, and solutions for the parameters $h_{ij}$ can still be determined.

Using closing error computations, point-to-point vector comparisons or other techniques, it will often be found that some error is present, based upon certain linear constraints that may be expressed by $$\sum_{j=1}^{N} [a_{kj} x'_{j,E1} + b_{kj} y'_{j,E1} + c_{kj} z'_{j,E1}] = d_k \quad (k=1,\ldots,K;\ K \geq 1), \tag{15}$$

where the coefficients $a_{kj}$, $b_{kj}$, $c_{kj}$ and $d_k$ are known/determined and fixed and are not all zero. These constraints may include the requirements that some or all of the coordinates $(x'_{i,E1}, y'_{i,E1}, z'_{i,E1})$ (i=1, ..., M) for the already-surveyed locations be unchanged, although this is not necessary. The K constraints are incorporated, using the Lagrange undetermined multiplier method or some other suitable approach. If one or more constraints of the form set forth in Eq. (15) is to be imposed, the quantity to be minimized would be $$\epsilon_p = \sum_{i=1}^{M} \{e_i|x''_{i,E2} - x'_{i,E2}|^p + f_i|y''_{i,E2} - y'_{i,E2}|^p + g_i|z''_{i,E2} - z'_{i,E2}|^p\}(1/p) + \tag{16}$$

$$\sum_{k=1}^{K}\sum_{j=1}^{N} \lambda_j(a_{kj} x'_{j,E1} + b_{kj} y''_{j,E1} + c_{kj} z'_{j,E1} - d_k),$$

where $\lambda j$ is an undetermined multiplier. Optionally, Eq. (16) replaces Eq. (5). This new expression for $\epsilon_p$ can be minimized with respect to the choices for the transformation coefficients $h_{ij}$ and the multipliers $\lambda j$; or the constraints in Eqs. (5) can be imposed directly on the coordinate transformation H in Eqs. (7), (8) and (9). If K>3, it may not be possible to satisfy all the constraints in Eq. (15).

If the new survey is performed on a known surface, for which one location coordinate z can be expressed as a known function of the other two location coordinates, x and y, as $$z = f(x, y), \tag{17}$$

the above analysis can be simplified. The coordinate transformation T1 from G1 to G2 becomes an L-parameter two-dimensional transformation, with z=f(x,y) and L≤6, of the form $$x''_{i,E2} = h_{11} x'_{i,E1} + h_{12} y'_{i,E1} + h_{14}, \tag{18}$$

$$y''_{i,E2} = h_{21} x'_{i,E1} + h_{22} y'_{i,E1} + h_{24}, \tag{19}$$

and the matrix equation (12) is deleted. In the absence of constraints such as Eq. (15), the quantity $\epsilon_p$ to be minimized simplifies to $$\epsilon_p = \sum_{i=1}^{M} \{e_i|x''_{i,E2} - x'_{i,E2}|^p + f_i|y''_{i,E2} - y'_{i,E2}|^p\}(1/p), \tag{20}$$

and Eqs. (10) and (11) for the choice p=2 simplify to $$\begin{bmatrix} \Sigma x'_{i,1} x'_{i,1} & \Sigma x'_{i,1} y'_{i,1} & \Sigma x'_{i,S1} \\ \Sigma y'_{i,1} x'_{i,1} & \Sigma y'_{i,1} y'_{i,1} & \Sigma y'_{i,1} \\ \Sigma x'_{i,1} & \Sigma y'_{i,1} & M \end{bmatrix} \begin{bmatrix} h_{11} \\ h_{12} \\ h_{14} \end{bmatrix} = \begin{bmatrix} \Sigma x'_{i,1} x'_{i,2} \\ \Sigma y'_{i,1} x'_{i,2} \\ \Sigma x'_{i,2} \end{bmatrix}, \tag{21}$$

$$\begin{bmatrix} \Sigma x'_{i,1} x'_{i,1} & \Sigma x'_{i,1} y'_{i,1} & \Sigma x'_{i,S1} \\ \Sigma y'_{i,1} x'_{i,1} & \Sigma y'_{i,1} y'_{i,1} & \Sigma y'_{i,1} \\ \Sigma x'_{i,1} & \Sigma y'_{i,1} & M \end{bmatrix} \begin{bmatrix} h_{21} \\ h_{22} \\ h_{24} \end{bmatrix} = \begin{bmatrix} \Sigma x'_{i,1} y'_{i,2} \\ \Sigma y'_{i,1} y'_{i,2} \\ \Sigma y'_{i,2} \end{bmatrix}, \tag{22}$$

and the solution column vectors $h_k = (h_{k1}, h_{k2}, h_{k4})^{tr}$ (k=1, 2) have the same form as in Eq. (14), where W is now the 3×3 matrix on the left hand side of Eq. (21) or (22). Here, L(≤6) parameters $h_{ij}$ (i=1,2; j=1,2,4) are to be determined. If constraint equations, such as Eq. (15) with the variables $z_{i,S}$ deleted, are imposed, the quantity to be minimized becomes $$\epsilon_p = \sum_{i=1}^{M} [e_i|x''_{i,E2} - x'_{i,E2}|^p + f_i|y''_{i,E2} - y'_{i,E2}|^p](1/p) + \tag{23}$$

$$\sum_{k=1}^{K}\sum_{j=1}^{N} \lambda_j (a_{kj} x''_{j,E1} + b_{kj} y''_{j,E1} - d_k),$$

where the quantities $\lambda j$ are again undetermined multipliers.

The location coordinates $(x'_{i,E1}, y'_{i,E1}, z'_{i,E1})$ (i=1, ..., N) in the global coordinate system G1 may also be transformed to a more convenient, local coordinate system S2, which may have coordinates (LATitude, LONgitude, ALTitude) or some other conveniently expressible set. This transformation is implemented by a transformation T3 that satisfies $$(x''_{i,S2}, y''_{i,S2}, z''_{i,S2}) = T3(S2;E1)(x'_{i,E1}, y'_{i,E1}, z'_{i,E1}). \tag{24}$$

If the transformation T3 is linear, Eqs. (6), (7) and (8) can be used, where the 12 parameters are now determined from the nature of the transformation T3, rather than by minimization of a pth power error sum, such as Eq. (5).

In a second embodiment of the transformation from coordinates on a first ellipsoid E1 to coordinates on a second ellipsoid E2, assume that a set of M location coordinate triples $\{(x'_{i,E2}, y'_{i,E2}, z'_{i,E2})\}$ (i=1, ..., M) is already available from one or more previous surveys. The location in E1 corresponding to each location in E2 is redetermined in a new survey, with corresponding location coordinates $\{(x'_{i,E1}, y'_{i,E1}, z'_{i,E1})\}$ (i=1, ..., N; N≥M). A coordinate transformation T1(G2;G1) is to be found that carries locations in E1 into locations in E2 and that carries the location coordinates $(x'_{i,E1}, y'_{i,E1}, z'_{i,E1})$ as closely as possible into the location coordinates $(x'_{i,E2}, y'_{i,E2}, z'_{i,E2})$ (i=1, 2, ..., M). In this embodiment, the transformation T1 is a seven-parameter linear transformation, expressed by $$\begin{bmatrix} x''_{i,E2} \\ y''_{i,E2} \\ z''_{i,E2} \end{bmatrix} = K \begin{bmatrix} \cos\theta 12 & \sin\theta 12 & 0 \\ -\sin\theta 12 & \cos\theta 12 & 0 \\ 0 & 0 & 1 \end{bmatrix} \begin{bmatrix} \cos\theta 13 & 0 & -\sin\theta 13 \\ 0 & 1 & 0 \\ \sin\theta 13 & 0 & \cos\theta 13 \end{bmatrix} \times \quad (25)$$

$$\begin{bmatrix} 1 & 0 & 0 \\ 0 & \cos\theta 23 & \sin\theta 23 \\ 0 & -\sin\theta 23 & \cos\theta 23 \end{bmatrix} \begin{bmatrix} x'_{i,E1} \\ y'_{i,E1} \\ z'_{i,E1} \end{bmatrix} + \begin{bmatrix} \Delta x_{E1} \\ \Delta y_{E1} \\ \Delta z_{E1} \end{bmatrix},$$

where K is a nonzero overall scale factor, $\theta 12$, $\theta 13$ and $\theta 23$ are angles of rotation about the third, second and first rectangular coordinates axes, respectively, and $\Delta x_{E1}$, $\Delta y_{E1}$, and $\Delta z_{E1}$ are translations parallel to the three coordinates axes. Equation (25) can be written more compactly in matrix notation as $$X''_{E2} = K R_3(\theta 12) R_2(\theta 13) R_1(\theta 23) X'_{E1} + \Delta X_{E1}, \quad (25')$$

$$X''_{E2} = \begin{bmatrix} x''_{i,E2} \\ y''_{i,E2} \\ z''_{i,E2} \end{bmatrix}, \quad (26)$$

$$X'_{E1} = \begin{bmatrix} x'_{i,E1} \\ y'_{i,E1} \\ z'_{i,E1} \end{bmatrix}, \quad (27)$$

$$\Delta X_{E1} = \begin{bmatrix} \Delta x_{E1} \\ \Delta y_{E1} \\ \Delta z_{E1} \end{bmatrix}, \quad (28)$$

where $R_3(\theta 12)$, $R_2(\theta 13)$ and $R_1(\theta 23)$ are the three 3×3 matrices on the right in Eq. (25), representing rotations by the respective angles $\theta 12$, $\theta 13$ and $\theta 23$ around the respective third axis, second axis and first axis. The order chosen for the rotation matrices $R_3$, $R_2$ and $R_1$ in Eq. (25) is merely illustrative. Any of the six permutations of rotation orders may be used here. Equations (25'), (26), (27) and (28) may thus be written more generally in the form $$X''_{E2} = K R_p(\theta qr) R_q(\theta rp) R_r(\theta pq) X'_{E1} + \Delta X_{E1}, \quad (25'')$$

$$X''_{E2} = \begin{bmatrix} x''_{i,E2} \\ y''_{i,E2} \\ z''_{i,E2} \end{bmatrix}, \quad (26'')$$

$$X'_{E1} = \begin{bmatrix} x'_{i,E1} \\ y'_{i,E1} \\ z'_{i,E1} \end{bmatrix}, \quad (27'')$$

$$\Delta X_{E2} = \begin{bmatrix} \Delta x_{E1} \\ \Delta y_{E1} \\ \Delta z_{E1} \end{bmatrix}, \quad (28'')$$

where $R_p(\theta qr)$, $R_q(\theta rp)$ and $R_r(\theta pq)$ are three 3×3 rotation matrices representing rotations by the respective angles $\theta qr$, $\theta rp$ and $\theta pq$ around the respective p-axis, the q-axis and the r-axis in the coordinate system G1 and the index triple (p,q,r) is a selected permutation of the index triple (1,2,3). Even more generally, the three indices p and r may be independently chosen without restriction from the numbers 1, 2 and 3, with q≠p and q≠r. In this last situation, for example, the rotation matrix sequence $R_1(\theta 31) R_3(\theta 11) R_1(\theta 13)$ could be used for the transformation set forth in Eq. (25").

The seven variables K, $\Delta x_{E1}$, $\Delta y_{E1}$, $\Delta z_{E1}$, $\theta 12$, $\theta 13$ and $\theta 23$ are chosen to optimize the transformation T1(E2;E1), by minimizing the error sum $$\epsilon_p = \sum_{i=1}^{M} \{e_i|x''_{E2,i} - x'_{E2,i}|^p + f_i|y''_{E2,i} - y'_{E2,i}|^p + g_i|z''_{E2,i} - z'_{E2,i}|^p\}(1/p), \quad (29)$$

where $e_i$, $f_i$ and $g_i$ are selected, non-negative, real weighting coefficients and p is a selected positive number. If, for example, the accuracy of the value of the third rectangular coordinate is of special concern, one can choose $0 < e_i = f_i < g_i$. For purposes of illustration here, the choice $e_i = f_i = g_i (=1)$ is made. Here, $(x'_{E2,i}, y'_{E2,i}, z'_{E2,i})(i=1, \ldots, M)$ are the known location coordinates of a point found in a previous survey, $(x'_{E1,i}, y'_{E1,i}, z'_{E1,i})$ $(i=1, \ldots, N)$ are the known location coordinates of a corresponding point found in the present survey, and $(x''_{E2,i}, y''_{E2,i}, z''_{E2,i})$ are the location coordinates of this present-survey point after application of the seven-parameter transformation T1 shown in Eq. (25).

Optimum values for the seven parameters for the transformation T1(G2;G1) may be estimated by iteration or by other approaches. For example, with the choice p=2, the error sum $$\epsilon_2 = \sum_{i=1}^{M} \{K^2[x'^2_{E1,i} + y'^2_{E1,i} + z'^2_{E1,i}] + [(\Delta x_{E1} - x'_{E2,i})^2 + \quad (30)$$

$$(\Delta y_{E1} - y'_{E2,i})^2 + (\Delta z_{E1} - z'_{E2,i})^2] +$$

$$2K(\Delta x_{E1} - x'_{E2,i})[x'_{E1,i}\cos\theta 12 \cos\theta 13 +$$

$$y'_{E1,i}(\cos\theta 12 \sin\theta 13 \sin\theta 23 + \sin\theta 12 \cos\theta 23) +$$

$$z'_{E1,i}(-\cos\theta 12 \sin\theta 13 \cos\theta 23 + \sin\theta 12 \sin\theta 23)] +$$

$$2K(\Delta y_{E1} - y'_{E2,i})[x'_{E1,i}\sin\theta 12 \cos\theta 13 +$$

$$y'_{E1,i}(-\sin\theta 12 \sin\theta 13 \sin\theta 23 + \cos\theta 12 \cos\theta 23) +$$

$$z'_{E1,i}(\sin\theta 12 \sin\theta 13 \cos\theta 23 + \cos\theta 12 \sin\theta 23)] +$$

$$2K(\Delta z_{E1} - z'_{E2,i})[x'_{E1,i}\sin\theta 13 - y'_{E1,i}\cos\theta 13 \sin\theta 23 +$$

$$z'_{E1,i}\cos\theta 13 \cos\theta 23]\}/2.$$

can be minimized by setting the partial derivatives with respect to each of the seven variables K, $\Delta x_{E1}$, $\Delta y_{E1}$, $\Delta z_{E1}$, $\theta 23$, $\theta 13$ and $\theta 12$ equal to 0. First, the abbreviations $$S_{1u} = \sum_{i=1}^{M} u'_{1,i}, \quad (31)$$

$$S_{2v} = \sum_{i=1}^{M} v'_{2,i}, \quad (32)$$

$$S_{1u,2v} = \sum_{i=1}^{M} u'_{1,i} v'_{2,i}, \quad (33)$$

$$S_{1u,1v} = \sum_{i=1}^{M} u'_{1,i} v'_{1,i}, \quad (34)$$

$$S_{2u,2v} = \sum_{i=1}^{M} u'_{2,i} v'_{2,i}, \quad (35)$$

$$u'_{1,i} = x'_{E1,i} \text{ or } y'_{E1,i} \text{ or } z'_{E1,i}, \quad (36)$$

$$v'_{2,i} = x'_{E2,i} \text{ or } y'_{E2,i} \text{ or } z'_{E2,i}, \quad (37)$$

are introduced. These 33 sums have known values and are determined by the location coordinates found in the previous survey and in the present survey. Partial differentiation of $\epsilon_2$ in Eq. (30) with respect to each of the seven variables leads to the following nonlinear relations between the variables:

$$\partial\epsilon_2/\partial K = K[S_{1x,1x} + S_{1y,1y} + S_{1z,1z}] + [(\Delta x_{E1}S_{1x} - \quad (38)$$

$$S_{1x,2x})\cos\theta 12 \cos\theta 13 + (\Delta x_{E1}S_{1y}S_{1y,2x})(\cos\theta 12\sin\theta 13\sin\theta 23 +$$

-continued $$\sin\theta 12\cos\theta 23) + (\Delta x_{EI}S_{Iz} - S_{Iz,2x})(-\cos\theta 12\sin\theta 13\cos\theta 23 +$$

$$\sin\theta 12\sin\theta 23) + (\Delta y_{EI}S_{Ix} - S_{Ix,2y})\sin\theta 12\cos\theta 13 + (\Delta y_{EI}S_{Iy} -$$

$$S_{Iy,2y})(-\sin\theta 12\sin\theta 13\sin\theta 23 + \cos\theta 12\cos\theta 23) + (\Delta y_{EI}S_{Iz} -$$

$$S_{Iy,2z})(\sin\theta 12\sin\theta 13\cos\theta 23 + \cos\theta 12\sin\theta 23) + (\Delta z_{EI}S_{Ix} -$$

$$S1x,2z)\sin\theta 13 - (\Delta z_{EI}S_{Iy} - S_{Iy,2z})\cos\theta 13\sin\theta 23 +$$

$$(\Delta z_{EI}S_{Iz} - S_{Iz,2z})\cos\theta 13\cos\theta 23] = 0,$$

$$\partial\epsilon_2/\partial\Delta x_{EI} = M\Delta x_{EI} - S_{2x} + 2K[S_{Ix}\cos\theta 12\cos\theta 13 + \tag{39}$$

$$S_{Iy}(\cos\theta 12\sin\theta 13\sin\theta 23 + \sin\theta 12\cos\theta 23) +$$

$$S_{Iz}(-\cos\theta 12\sin\theta 13\cos\theta 23 + \sin\theta 12\sin\theta 23)] = 0,$$

$$\partial\epsilon_2/\partial\Delta y_{EI} = M\Delta y_{EI} - S_{2y} + 2K[S_{Ix}\sin\theta 12\cos\theta 13 + \tag{40}$$

$$S_{Iy}(-\sin\theta 12\sin\theta 13\sin\theta 23 + \cos\theta 12\cos\theta 23) +$$

$$S_{Iz}(\sin\theta 12\sin\theta 13\cos\theta 23 + \cos\theta 12\sin\theta 23)] = 0,$$

$$\partial\epsilon_2/\partial\Delta z_{EI} = M\Delta z_{EI} - S_{2z} + 2K[S_{Ix}\sin\theta 13 - \tag{41}$$

$$S_{Iy}\cos\theta 13\sin\theta 23 + S_{Iz}\cos\theta 13\cos\theta 23] = 0,$$

$$\partial\epsilon_2/\partial\theta 12 = K[-(\Delta x_{EI}S_{Ix} - S_{Ix,2x})\sin\theta 12\cos\theta 13 + \tag{42}$$

$$(\Delta x_{EI}S_{Iy} - S_{Iy,2x})(-\sin\theta 12\sin\theta 13\sin\theta 23 + \cos\theta 12\cos\theta 23) +$$

$$(\Delta x_{EI}S_{Iz} - S_{Iz,2x})(\sin\theta 12\sin\theta 13\cos\theta 23 - \cos\theta 12\sin\theta 23) +$$

$$(\Delta y_{EI}S_{Ix} - S_{Ix,2y})\cos\theta 12\cos\theta 13 + (\Delta y_{EI}S_{Iy} -$$

$$S_{Iy,2y})(-\cos\theta 12\sin\theta 13\sin\theta 23 - \sin\theta 12\cos\theta 23) + (\Delta y_{EI}S_{Iz} -$$

$$S_{Iz,2y})(\cos\theta 12\sin\theta 13\cos\theta 23 - \sin\theta 12\sin\theta 23)] = 0,$$

$$\partial\epsilon_2/\partial\theta 13 = K[-(\Delta x_{EI}S_{Ix} - S_{Ix,2x})\cos\theta 12\sin\theta 13 + (\Delta x_{EI}S_{Iy} - \tag{43}$$

$$S_{Iy,2x})\cos\theta 12\cos\theta 13\sin\theta 23 - (\Delta x_{EI}S_{Iz} -$$

$$S_{Iz,2x})\cos\theta 12\cos\theta 13\cos\theta 23 - (\Delta y_{EI}S_{Ix} - S_{Ix,2y})\sin\theta 12\sin\theta 13 -$$

$$(\Delta y_{EI}S_{Iy} - S_{Iy,2y})\sin\theta 12\cos\theta 13\sin\theta 23 + (\Delta y_{EI}S_{Iz} -$$

$$S_{Iz,2y})\sin\theta 12\cos\theta 13\cos\theta 23 + (\Delta z_{EI}S_{Ix} - S_{Ix,2z})\cos\theta 13 +$$

$$(\Delta z_{EI}S_{Iy} - S_{Iy,2z})\sin\theta 13\sin\theta 23 - (\Delta z_{EI}S_{Iz} -$$

$$S_{Iz,2z})\sin\theta 13\cos\theta 23] = 0,$$

$$\partial\epsilon_2/\partial\theta 23 = K[(\Delta x_{EI}S_{Iy} - S_{Iy,2x})(\cos\theta 12\sin\theta 13\cos\theta 23 - \tag{44}$$

$$\sin\theta 12\sin\theta 23) + (\Delta x_{EI}S_{Iz} - S_{Iz,2x})(\cos\theta 12\sin\theta 13\sin\theta 23 +$$

$$\sin\theta 12\cos\theta 23) + (\Delta y_{EI}S_{Iy} - S_{Iy,2y})(-\sin\theta 12\sin\theta 13\cos\theta 23 -$$

$$\cos\theta 12\sin\theta 23) + (\Delta y_{EI}S_{Iz} - S_{Iz,2y})(-\sin\theta 12\sin\theta 13\sin\theta 23 +$$

$$\cos\theta 12\cos\theta 23) - (\Delta z_{EI}S_{Iy} - S_{Iy,2z})\cos\theta 13\cos\theta 23 -$$

$$(\Delta z_{EI}S_{Iz} - S_{Iz,2z})\cos\theta 13\sin\theta 23] = 0,$$

Solutions of these seven nonlinear equations may be found or estimated by iteration, gradient methods or other approaches. Equation (41) is recast as $$M\Delta z_{E1} - S_{2z} + 2K[S_{1x}^2 + S_{1z}^2 + (S_{1y}^2 - S_{1z}^2)\sin^2\theta 23]^{1/2} \sin$$
$$\{\theta 13 - \tan^{-1}[(S_{1y}\sin\theta 23 - S_{1z}\cos\theta 23)/S_{1x}]\}. \tag{41'}$$

This last relation is partly separable in the parameters $\Delta z_{E1}$, K, $\theta 13$ and $\theta 23$ and may be used to reduce the amount of computation required in the other relations in Eqs. (38)–(44).

The parameter K may be cancelled from each of Eqs. (42), (43) and (44), and Eq. (41') may be used to eliminate K from Eqs. (38), (39) and (40). The result of these manipulations is six linked, nonlinear relations in the parameters $\Delta x_{E1}$, $\Delta y_{E1}$, $\Delta z_{E1}$, $\theta 23$, $\theta 13$ and $\theta 12$, where $\Delta x_{E1}$, $\Delta y_{E1}$ and $\Delta z_{E1}$ appear only linearly. The resulting Eqs. (38), (39) and (40) are analyzed as simultaneous linear relations in the parameters $\Delta x_{E1}$, $\Delta y_{E1}$ and $\Delta z_{E1}$, and the solutions of these three relations are then inserted in Eqs. (42), (43) and (44) to produce three highly nonlinear relations in the remaining parameters $\theta 23$, $\theta 13$ and $\theta 12$. The solutions of these last three relations in the parameters $\theta 23$, $\theta 13$ and $\theta 12$ are then determined iteratively, using gradient techniques or other suitable approaches. The solutions for the parameters $\theta 23$, $\theta 13$ and $\theta 12$, plus Eq. (41'), are then inserted into Eqs. (38), (39) and (40) to determine the values for the remaining parameters $\Delta x_{E1}$, $\Delta y_{E1}$, $\Delta z_{E1}$ and K. By this approach, a seven-parameter, nonlinear system of equations is reduced to a three-parameter, nonlinear system of equations.

If the survey measurements are performed only on a known surface, for which the value of one location coordinate z can be expressed as a known function $z=f(x,y)$ of the other two coordinates x and y as in Eq. (17), a transformation T1 that is analogous to that developed in Eqs. (25'), (26), (27) and (28) can be developed. In this simplified situation, the transformation T1 of G1 into G2 is expressed in matrix form as $$X''_{E2} = K\,R_3(\theta 12)X'_{E1} + \Delta X_{EI}, \tag{45}$$

$$X''_{E2} = \begin{bmatrix} x''_{i,E2} \\ y''_{i,E2} \end{bmatrix}, \tag{46}$$

$$X'_{E1} = \begin{bmatrix} x'_{i,E1} \\ y'_{i,E1} \end{bmatrix}, \tag{47}$$

$$\Delta X_{E1} = \begin{bmatrix} \Delta x_{E1} \\ \Delta y_{E1} \end{bmatrix}, \tag{48}$$

$$R_3(\theta 12) = \begin{bmatrix} \cos\theta 12 & \sin\theta 12 \\ -\sin\theta 12 & \cos\theta 12 \end{bmatrix}, \tag{49}$$

where $R_3(\theta 12)$ is a 2×2 rotation matrix representing rotation by the angle $\theta 12$ around an axis perpendicular to a plane in the coordinate system G1, and the four variables K, $\theta 12$, $\Delta x_{E1}$ and $\Delta y_{E1}$ are selected real number adjustable parameters for said transformation T1 with K non-zero. Here, $L \leq 4$.

Proceeding by analogy with development of the error sum $\epsilon_2$ in Eq. (29), the error sum for this simpler two-dimensional situation becomes $$\epsilon_2 = \sum_{i=1}^{M} [K^2(x'^2_{i,E1} + y'^2_{i,E1}) + \Delta x^2_{E1} + \Delta y_{E12} + x'^2_{i,E2} + y'^2_{i,E2} + \tag{50}$$

$$2K(\Delta x_{EI} - x'_{1,2E})(x'_{i,E1}\cos\theta 12 + y'_{i,E1}\sin\theta 12) +$$

$$2K(\Delta y_{EI} - y'_{1,2E})(-x'_{i,E1}\sin\theta 12 + y'_{i,E1}\cos\theta 12) -$$

$$2\Delta x_{EI}\,x'_{i,E2} - 2\Delta y_{EI} y'_{i,E2}]/2.$$

Four partial derivatives of $\epsilon_2$ with respect to the parameters $\Delta x_{E1}$, $\Delta y_{E1}$, K and $\theta 12$ are formed and set equal to zero. The first two of these relations may be rearranged to read $$M\Delta x_{E1} - \sum_{i=1}^{M} x'_{i,E2} = -K \sum_{i=1}^{M} (x'_{i,E1}\cos\theta 12 + y'_{i,E1}\sin\theta 12), \tag{51}$$

$$M\Delta y_{E1} - \sum_{i=1}^{M} y'_{i,E2} = -K \sum_{i=1}^{M} (-x'_{i,E1}\sin\theta 12 + y'_{i,E1}\cos\theta 12). \tag{52}$$

The last two of these four relations become $$\partial \epsilon_2/\partial K = K \sum_{i=1}^{M} [(x'^2_{i,E1} + y'^2_{i,E1}) + (\Delta x_{E1} - x'_{i,E2})(x'_{i,E1}\cos\theta 12 + \quad (53)$$

$$y'_{i,E1}\sin\theta 12) + (\Delta y_{E1} - y'_{i,E2})(-x'_{i,E1}\sin\theta 12 + y'_{i,E1}\cos\theta 12)] = 0,$$

$$\partial \epsilon_2/\partial \theta 12 = K \sum_{i=1}^{M} [(\Delta x_{E1} - x'_{i,E2})(x'_{i,E1}\cos\theta 12 + y'_{i,E1}\sin\theta 12) + \quad (54)$$

$$(\Delta y_{E1} - y'_{i,E2})(-x'_{i,E1}\sin\theta 12 + y'_{i,E1}\cos\theta 12)] = 0.$$

Equations (51) and (52) may be used to remove explicit dependence on the parameters $\Delta x_{E1}$ and $\Delta y_{E1}$ and to re-express Eqs. (53) and (54) as (i) a simple expression for K in terms of the variable θ12 and (ii) a single homogeneous relation involving only the variable θ12.

Figure 7:
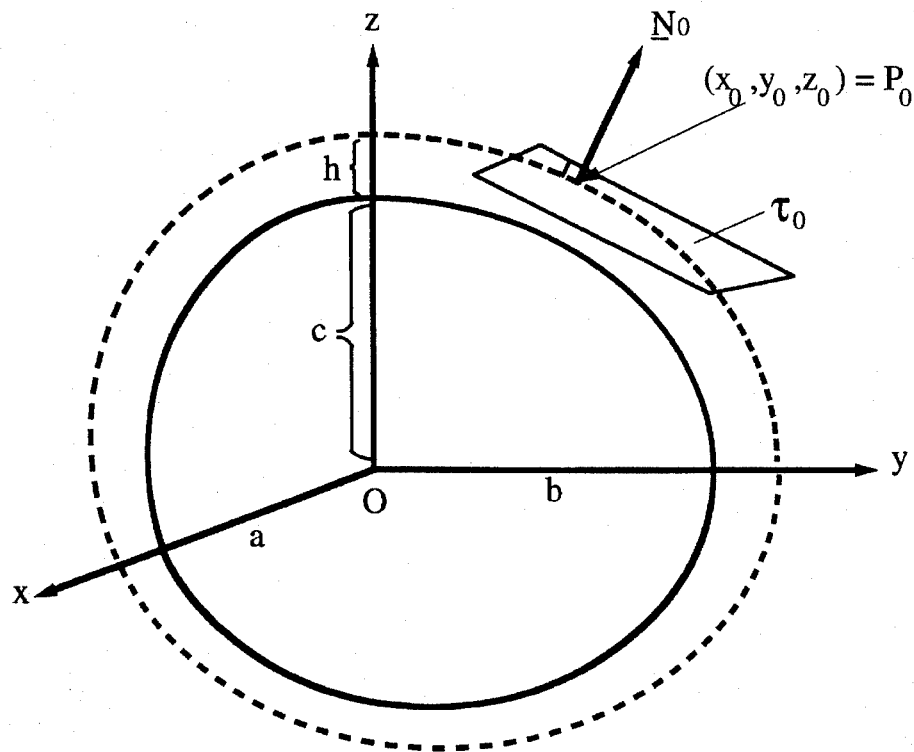
FIGS. 7 and 8 illustrate two methods for relating location coordinate measurements made in a global coordinate system to location coordinates for a corresponding location in a selected local coordinate system.
Figure 8:
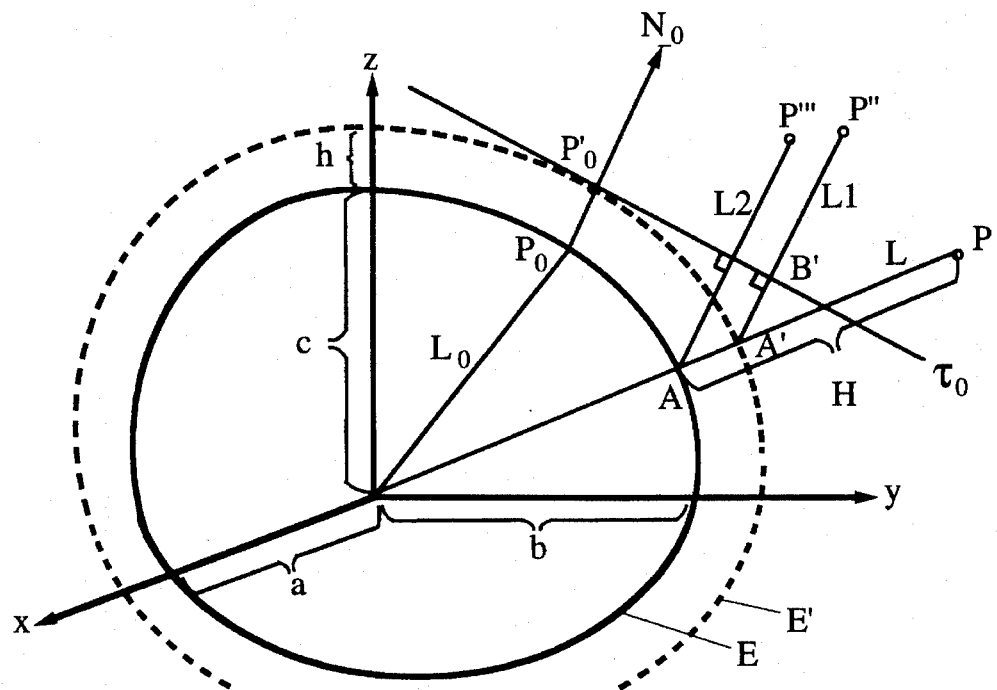

Another transformation that must be determined is a projection T2 of a point, determined in terms of the rectangular coordinates for the WGS 84 or the NAD 83 ellipsoid, into a second rectangular coordinate system that is defined relative to a plane that is tangent to the ellipsoid surface, or to a "parallel" ellipsoid surface, at a selected point. FIGS. 7 and 8 illustrate this projection in one embodiment. In FIG. 7 an ellipsoid surface E is centered at the origin O of a first rectangular coordinate system (x,y,z) and is defined by the equation $$(x/a)^2+(y/b)^2+(z/c)^2=1. \quad (55)$$

For the WGS 84 and NAD 83 ellipsoids, a=b>c. However, these simplifications are not required here. A "parallel" ellipsoid E' is also centered at O and is defined by the equation $$(x/(a+h))^2+(y/(b+h))^2+(z/(c+h))^2=1, \quad (56)$$

as shown in FIG. 7, where h can be positive, zero or negative. A projection plane τ0, tangent to the ellipsoid surface E' at a selected location P0' with spatial coordinates $(x'_0,y'_0,z'_0)$, is introduced, and the partial derivatives $$(\partial z/\partial x)_{P0}=-(c+h)^2 x'_0/(a+h)^2 z'_0=m_{zx}, \quad (57)$$

$$(\partial z/\partial y)_{P0}=-(c+h)^2 y'_0/(b+h)^2 z'_0=m_{zy}, \quad (58)$$

are computed. The derivatives partial $m_{zx}$ and $m_{zy}$ cannot vanish simultaneously on the surface of the ellipsoid surface E, except at the two poles. Any differentiable curved surface for which $m_{zx}$ and $m_{zy}$ do not vanish simultaneously, except at a finite number of isolated points, can be used in this development; the results are not limited to an ellipsoid surface.

Let P0 be the intersection point on the ellipsoid surface E (or other curved surface) of a line drawn from the origin O through the point P0'. The projection plane τ0 is close to, but not exactly parallel to, the tangent plane τ0 to the ellipsoid surface E at the corresponding point P0, unless h=0 and E'=E. The distance h is sometimes called the "height" of the projection plane τ0 above the surface of the ellipsoid surface E. The local perpendicular distance or separation distance from an arbitrary point P0 on E to the ellipsoid surface E' is close to but less than h, except at the poles (x=y=0) and at the equator of the ellipsoid surface E.

The projection plane τ0 is defined by the equation $$-m_{zx}(x-x'_0)-m_{zy}(y-y'_0)+z-z'_0=0, \quad (59)$$

and the unit length vector $$N0=(-m_{zx}I-m_{zy}J+K)/(1+m^2)^{1/2}, \quad (60)$$

$$m^2=m_{zx}^2+m_{zy}^2, \quad (61)$$

is verified after some computation to be normal or perpendicular to the projection plane τ0, where I, J and K are fixed, orthogonal, unit length vectors parallel to the respective x, y and z axes of the first rectangular coordinate system. The second rectangular coordinate system $(x_\tau,y_\tau,z_\tau)$ is introduced with reference to the projection plane τ0, as shown in FIG. 7, where the $y_\tau$ coordinate axis is preferably chosen parallel to the xy-plane (no z-component) for the first rectangular coordinate system, the $z_\tau$ axis is normal to the plane τ0, and the origin of this second coordinate system is the point P0'. The $x_\tau$, $y_\tau$ and $z_\tau$ axes then become the local Northing, Easting and Height coordinates, respectively, with the $x_\tau$-axis and $y_\tau$-axis being parallel to the local latitude line (longitude=constant) and to the local longitude line (latitude=constant), respectively, in the projection plane τ0.

In FIG. 8, FIG. 7 is rotated so that the projection plane τ0 appears as a line, for clarity of representation. The location coordinates $(x_P,y_P,z_P)$ of a location P in the first coordinate system are measured with reference to the ellipsoid surface E (not E'). A line L passing through the points O and P as a parametric representation $$x=x_A s, \quad (62)$$

$$y=y_A s, \quad (63)$$

$$z=z_A s, \quad (64)$$

where s is variable and the point A, defined by the intersection of the line L with the ellipsoid surface E, has the known location coordinates $(x_A,y_A,z_A)$. The distance of the location P front the point A is H, which is assumed to be known. The location coordinates $(x_P,y_P,z_P)$ of the point P in the ellipsoid coordinate system are easily verified to be $$x_P=x_A s_P, \quad (65)$$

$$y_P=y_A s_P, \quad (66)$$

$$z_P=z_A s_P, \quad (67)$$

$$[(x_A)^2+(y_A)^2+(z_A)^2]^{1/2}(s_P-1)=H. \quad (68)$$

The location coordinates $(x_{A'},y_{A'},z_{A'})$ of a point A', defined by the intersection of the line L with the ellipsoid surface E', are easily found to be $$x_{A'}=x_A s_{A'}, \quad (69)$$

$$y_{A'}=y_A s_{A'}, \quad (70)$$

$$z_{A'}=z_A s_{A'}, \quad (71)$$

$$s_{A'}=[(x_A/a)^2+(y_A/b)^2+(z_A/(c+h))^2]^{-1/2}. \quad (72)$$

This determines the coordinates of the points A, A' and P in the first coordinate system. Note that the line L0 passing through the origin O and through the point P0' is not perpendicular to the projection plane π0, except where the point P0 lies at a pole (x=y=0) or on the equator of the ellipsoid E.

In a first embodiment, a line L1 is passed through the point A on the ellipsoid E, parallel to the vector N0 that is perpendicular to the projection plane τ0. The line L1 intersects the ellipsoid E' at a second point B' and contains a third point P'' that lies above (or below) the projection plane τ0 by a (signed) distance $\Delta z_\tau$=H−c−h, which may be positive, zero or negative. The location coordinates of the point B' are given by $$x_B = x_A - m_{zx} s_{B'}/[1+m^2]^{1/2}, \tag{73}$$

$$y_B = y_A - m_{zy} s_{B'}/[1+m^2]^{1/2}, \tag{74}$$

$$z_B = z_A + s_{B'}/[1+m^2]^{1/2}, \tag{75}$$

where the parameter $s_{B'}$ is determined by the requirement that the point B' lie in the projection plane $\pi 0$, viz.

$$-m_{zx}(x_B - x'_0) - m_{zy}(y_B - y'_0) + z_B - z'_0 = 0. \tag{76}$$

The location coordinates of the point P'' are given by $$x_{P''} = x_A - m_{zx} s_{P''}/[1+m^2]^{1/2}, \tag{77}$$

$$y_{P''} = y_A - m_{zy} s_{P''}/[1+m^2]^{1/2}, \tag{78}$$

$$z_{P''} = z_A + s_{P''}/[1+m^2]^{1/2}, \tag{79}$$

$$s_{P''} = s_{B'} + H - c - h. \tag{80}$$

The point P'', referenced to the projection plane $\tau 0$, corresponds to the point P, referenced to the ellipsoid E'.

The point P'' can also be defined with reference to the second rectangular coordinate system ($x_{96}$ $y_\tau$ m$z_\tau$), in which the projection plane $\tau 0$ serves as the $x_{\tau y\tau}$-plane and the $y_\tau$-axis lies in the xy-plane, as set forth above. After some computation, one verifies that the $x_\tau$-axis, the $y_\tau$-axis and the $z_\tau$-axis are respectively parallel to three orthogonal, unit length vectors $I_\tau, J_\tau$ and $K_\tau$ that are given, apart from a $\pm 1$ sign, by $$I_\tau = [m_{zx}I + m_{zy}J + (m_{zx}^2 + m_{zy}^2)K]/[1+m^2+m^4]^{1/2}, \tag{81}$$

$$J_\tau = (m_{zy}I - m_{zx}J)/[1+m^2]^{1/2}, \tag{82}$$

$$K_\tau = (-m_{zx}I - m_{zy}J + K)/[1+m^2]^{1/2} = N0, \tag{83}$$

The three vectors I, J and K can also be expressed in terms of the three vectors $I_\pi$, $J_\pi$ and $K_\pi$, viz.

$$I = [m_{zx}I_\tau + m_{zy}(1+m^2)J_\tau - m^2 K_\tau]/m^2[1+2m_{zy}^2(1+m^2)++m^2]^{1/2}, \tag{84}$$

$$J = [m_{zy}I_\tau - m_{zx}(1+m^2)J_\tau - m_{zy}m^2 K_\tau]/[m^2(b\ 1+m^4)++2m_{zx}^2 m]^{1/2}, \tag{85}$$

$$K = [(m^2+m^4-m_{zy}^4)I_\tau - m_{zx}m_{zy}(1+m_{zx}^2)J_\tau + (1+m_{zx}^2 - m_{zx}^2 m_{zy}^2)K_\tau]/[1+m^2 m_{zx}^2 m_{zy}^2 + m^4 + +m^8]^{1/2}. \tag{86}$$

This determines the location coordinates $(x_{P\tau}, y_{P\tau}, z_{P\tau})$ for the point P''=P$\tau$, computed in the second coordinate system, corresponding to the location coordinates $(x_P, y_P, z_P)$ measured in the first coordinate system. This correspondence is 1–1 so that the location coordinates $(x_P, y_P, z_P)$ for the point P in the first coordinate system can be determined that correspond to the location coordinates $(x_{P\tau}, y_{P\tau}, z_{P\tau})$ the "projected" point P$\tau$=P'', measured in the second coordinate system.

In a second embodiment, also illustrated in FIG. 8, a line L2 drawn is drawn through the point A and parallel to the vector N0. A point P''' (usually outside the ellipsoid E), located on the line L''' a distance H from the point A, corresponds to the point P on the line L. The location coordinates of the point P''' are verified to be $$x_{P'''} = x_A - m_{zx} s_{P'''}/[1+m^2]^{1/2}, \tag{87}$$

$$y_{P'''} = y_A - m_{zy} s_{P'''}/[1+m^2]^{1/2}, \tag{88}$$

$$z_{P'''} = z_A + s_{P'''}/[1+m^2]^{1/2}, \tag{89}$$

$$s_{P'''} = H. \tag{90}$$

Equations (81)–(83) and (84)–(86), relating the vectors defining the coordinate axes in the first and second rectangular coordinate systems, are unchanged. The first embodiment and the second embodiment each provide a 1–1 correspondence between the location coordinates of the point P in the first coordinate system and the location coordinates of the point P'' (or P''') in the second coordinate system. The second embodiment here has the advantage that only the point of intersection A, not the point of intersection A', in FIG. 8 need be determined in order to determine the "projected" point P''', measured in the second coordinate system, that corresponds to the point P.

A Satellite Positioning System (SATPS) is a system or satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto$f$^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90; the information from this reference is incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably three or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit.

We claim:

1. A method for determining location coordinates for a plurality of surveyed locations, the method comprising the steps of:

providing a location determination (LD) receiver having an LD signal antenna and an LD signal receiver/processor to receive and process LD signals transmitted from three or more LD signal sources, which are spaced apart from the LD receiver, and to use these LD signals to determine three-dimensional location coordinates for the LD signal antenna;

using the LD signals received at the LD receiver to determine a first set of three-dimensional location coordinates $(x'_{n,1}, y'_{n,1}, z'_{n,1})$ for N selected presently-surveyed locations, numbered n=1, 2, . . . , N (N≧3) in a first coordinate system G1;

providing a second set of three-dimensional location coordinates $(x'_{m,2}, y'_{m,2}, z'_{m,2})$ for M previously-surveyed locations, numbered m=1, 2, . . . , M (M≦N), where each previously-surveyed location number m=k is coincident with the presently-surveyed location number n=k for k=1, 2, . . . , M;

providing a three-dimensional coordinate transformation T(G2;G1) of the first coordinate system G1 onto a second three-dimensional coordinate system G2, under which the location coordinates $(x'_{n,1}, y'_{n,1}, z'_{n,1})$ for each of the N presently-surveyed locations in G1 are transformed into location coordinates $(x''_{n,2}, y''_{n,2}, z''_{n,2})$ in G2 (n=1, 2, . . . , N);

choosing the transformation T(G2;G1) so that the error sum $$\epsilon_p = \left[ \sum_{m=1}^{M} \{e_m|x''_{m,2} - x'_{m,2}|^p + f_m|y''_{m,2} - y'_{m,2}|^p + g_m|z''_{m,2} - z'_{m,2}|^p\} \right]^{[1/p]},$$

is minimized, where p is a selected positive number and $e_m, f_m$ and $g_m$ are selected non-negative weight coefficients; and determining the location coordinates $(x''_{n,2}, y''_{n,2}, z''_{n,2})$ for at least one of the presently surveyed locations (n=1, 2, ..., N) under the transformation T(G2;G1), and displaying these location coordinates by a visually perceptible or audibly perceptible image.

2. The method of claim 1, further comprising the step of choosing as said transformation T(G2;G1) the coordinate transformation $$x''_{E2} = h_{11}x'_{E1} + h_{12}y'_{E1} + h_{13}z'_{E1} + h_{14},$$

$$y''_{E2} = h_{21}x'_{E1} + h_{22}y'_{E1} + h_{23}z'_{E1} + h_{24},$$

$$z''_{E2} = h_{31}x'_{E1} + h_{32}y'_{E1} + h_{33}z'_{E1} + h_{34},$$

where $h_{ij}$ (i=1, 2, 3; j=1, 2, 3, 4) are selectable parameters.

3. The method of claim 2, further comprising the steps of:

selecting said number p=2 and selecting all of said coefficients $e_m$, $f_m$ and $g_m$ equal to a common positive number; and choosing said transformation parameters $h_{ij}$ to satisfy the relations $$\begin{bmatrix} \Sigma x'_{i,1}x'_{i,1} & \Sigma x'_{i,1}y'_{i,1} & \Sigma x'_{i,1}z'_{i,1} & \Sigma x'_{i,1} \\ \Sigma y'_{i,1}x'_{i,1} & \Sigma y'_{i,1}y'_{i,1} & \Sigma y'_{i,1}z'_{i,1} & \Sigma y'_{i,1} \\ \Sigma z'_{i,1}x'_{i,1} & \Sigma z'_{i,1}y'_{i,1} & \Sigma z'_{i,1}z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{11} \\ h_{12} \\ h_{13} \\ h_{14} \end{bmatrix} = \begin{bmatrix} \Sigma x'_{i,1}x'_{i,2} \\ \Sigma y'_{i,1}x'_{i,2} \\ \Sigma z'_{i,1}x'_{i,2} \\ \Sigma x'_{i,2} \end{bmatrix},$$

$$\begin{bmatrix} \Sigma x'_{i,1}x'_{i,1} & \Sigma x'_{i,1}y'_{i,1} & \Sigma x'_{i,1}z'_{i,1} & \Sigma x'_{i,1} \\ \Sigma y'_{i,1}x'_{i,1} & \Sigma y'_{i,1}y'_{i,1} & \Sigma y'_{i,1}z'_{i,1} & \Sigma y'_{i,1} \\ \Sigma z'_{i,1}x'_{i,1} & \Sigma z'_{i,1}y'_{i,1} & \Sigma z'_{i,1}z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{21} \\ h_{22} \\ h_{23} \\ h_{24} \end{bmatrix} = \begin{bmatrix} \Sigma x'_{i,1}y'_{i,2} \\ \Sigma y'_{i,1}y'_{i,2} \\ \Sigma z'_{i,1}y'_{i,2} \\ \Sigma y'_{i,2} \end{bmatrix},$$

$$\begin{bmatrix} \Sigma x'_{i,1}x'_{i,1} & \Sigma x'_{i,1}y'_{i,1} & \Sigma x'_{i,1}z'_{i,1} & \Sigma x'_{i,1} \\ \Sigma y'_{i,1}x'_{i,1} & \Sigma y'_{i,1}y'_{i,1} & \Sigma y'_{i,1}z'_{i,1} & \Sigma y'_{i,1} \\ \Sigma z'_{i,1}x'_{i,1} & \Sigma z'_{i,1}y'_{i,1} & \Sigma z'_{i,1}z'_{i,1} & \Sigma z'_{i,1} \\ \Sigma x'_{i,1} & \Sigma y'_{i,1} & \Sigma z'_{i,1} & M \end{bmatrix} \begin{bmatrix} h_{31} \\ h_{32} \\ h_{33} \\ h_{34} \end{bmatrix} = \begin{bmatrix} \Sigma x'_{i,1}z'_{i,2} \\ \Sigma y'_{i,1}z'_{i,2} \\ \Sigma z'_{i,1}z'_{i,2} \\ \Sigma z'_{i,2} \end{bmatrix},$$

where each sum is a sum over i=1, 2, ..., M), corresponding to the M previously-surveyed locations (i=1, 2, ..., M).

4. The method of claim 1, further comprising the step of choosing as said transformation T(G2;G1) the transformation defined by (1) a first rotation of the coordinate system around a selected first coordinate axis by a first selected angle $\theta_1$, followed by (2) a second rotation of the coordinate system around a selected second coordinate axis by a selected second angle $\theta_2$, followed by (3) a third rotation of the coordinate system about a selected third coordinate axis by a selected third angle $\theta_3$, followed by (4) multiplication of the location coordinates resulting from the first, second and third rotations by a real number scale factor K, followed by (5) translation of the resulting first, second and third location coordinates by selected amounts $\Delta x_1, \Delta y_1$ and $\Delta z_1$, where $\theta_1, \theta_2, \theta_3, K, \Delta x_1, \Delta y_1$ and $\Delta z_1$ are selectable parameters, and where the selected second coordinate axis does not coincide with the selected first coordinate axis and does not coincide with the selected third coordinate axis.

5. The method of claim 4, further comprising the step of choosing as said transformation T(G2;G1) the coordinate transformation $$\begin{bmatrix} x''_{i,2} \\ y''_{i,2} \\ z''_{i,2} \end{bmatrix} = K \begin{bmatrix} \cos\theta12 & \sin\theta12 & 0 \\ -\sin\theta12 & \cos\theta12 & 0 \\ 0 & 0 & 1 \end{bmatrix} \begin{bmatrix} \cos\theta13 & 0 & -\sin\theta13 \\ 0 & 1 & 0 \\ \sin\theta13 & 0 & \cos\theta13 \end{bmatrix} \times$$

$$\begin{bmatrix} 1 & 0 & 0 \\ 0 & \cos\theta23 & \sin\theta23 \\ 0 & -\sin\theta23 & \cos\theta23 \end{bmatrix} \begin{bmatrix} x'_{i,1} \\ y'_{i,1} \\ z'_{i,1} \end{bmatrix} + \begin{bmatrix} \Delta x_1 \\ \Delta y_1 \\ \Delta z_1 \end{bmatrix},$$

where $\theta_3=\theta12, \theta_2=\theta13$ and $\theta_1=\theta23$ are angles of rotation about the third, second and first rectangular coordinates axes, respectively, and $\Delta x_1, \Delta y_1,$ and $\Delta z_1$ are translations parallel to the respective first, second and third coordinates axes in G1.

6. The method of claim 5, further comprising the steps of:

selecting said number p=2 and selecting all of said coefficients $e_m$, $f_m$ and $g_m$ equal to a common positive number.

7. The method of claim 1, further comprising the step of selecting said LD signal sources from the class of satellite-based LD signal sources consisting of Global Positioning System satellites and Global Orbiting Navigational Satellite System satellites.

8. The method of claim 1, further comprising the step of selecting said LD signal sources from the class of ground-based LD signal sources consisting of signal beacons for transmitting Loran signals, Tacan signals, Decca signals, Omega signals, JTIDS Relnav signals and Personal Location Reporting Service (PLRS) signals.

9. A method for determining location coordinates for a plurality of surveyed locations, the method comprising the steps of:

providing a location determination (LD) receiver having an LD signal antenna and an LD signal receiver/processor to receive and process LD signals transmitted from two or more LD signal sources, which are spaced apart from the LD receiver, and to use these LD signals to determine two-dimensional location coordinates for the LD signal antenna;

using the LD signals received at the LD receiver to determine a first set of two-dimensional location coordinates $(x'_{n,1}, y'_{n,1})$ for N selected presently-surveyed locations, numbered n=1, 2, ..., N (N≥3) in a first coordinate system G1;

providing a second set of two-dimensional location coordinates $(x'_{m,2}, y'_{m,2})$ for M previously-surveyed locations, numbered m=1, 2, ..., M (M≤N), where each previously-surveyed location number m=k is coincident with the presently-surveyed location number n=k for k=1, 2, ..., M;

providing a two-dimensional coordinate transformation T(G2;G1) of the first coordinate system G1 onto a second two-dimensional coordinate system G2, under which the location coordinates $(x'_{n,1}, y'_{n,1})$ for each of the N presently-surveyed locations in G1 are transformed into location coordinates $(x''_{n,2}, y''_{n,2})$ in G2 (n=1, 2, ..., N);

choosing the transformation T(G2;G1) so that the error sum $$\epsilon_p = \left[ \sum_{m=1}^{M} \{e_m|x''_{m,2} - x'_{m,2}|^p + f_m|y''_{m,2} - y'_{m,2}|^p\} \right]^{[1/p]},$$

is minimized, where p is a selected positive number and $e_m$ and $f_m$ are selected non-negative weight coefficients; and determining the location coordinates $(x''_{n,2}, y''_{n,2})$ for at least one of the presently surveyed locations (n=1, 2, ..., N) under the transformation T(G2;G1), and displaying these location coordinates by a visually perceptible or audibly perceptible image.

10. The method of claim 9, further comprising the step of choosing as said transformation T(G2;G1) the coordinate transformation $$x''_{i,2} = h_{11}x'_{i,1} + h_{12}y'_{i,1} + h_{14},$$

$$y''_{i,1} = h_{21}x'_{i,1} + h_{22}y'_{i,1} + h_{24},$$

where $h_{ij}$ (i=1, 2; j=1, 2, 4) are selectable parameters.

11. The method of claim 10, further comprising the steps of:

selecting said number p=2 and selecting all of said coefficients $e_m$ and $f_m$ equal to a common positive number; and choosing said transformation parameters $h_{ij}$ to satisfy the relations $$\begin{bmatrix} \Sigma x'_{i,1} x'_{i,1} & \Sigma x'_{i,1} y'_{i,1} & \Sigma x'_{i,S1} \\ \Sigma y'_{i,1} x'_{i,1} & \Sigma y'_{i,1} y'_{i,1} & \Sigma y'_{i,1} \\ \Sigma x'_{i,1} & \Sigma y'_{i,1} & M \end{bmatrix} \begin{bmatrix} h_{11} \\ h_{12} \\ h_{14} \end{bmatrix} = \begin{bmatrix} \Sigma x'_{i,1} x'_{i,2} \\ \Sigma y'_{i,1} x'_{i,2} \\ \Sigma x'_{i,2} \end{bmatrix},$$

$$\begin{bmatrix} \Sigma x'_{i,1} x'_{i,1} & \Sigma x'_{i,1} y'_{i,1} & \Sigma x'_{i,S1} \\ \Sigma y'_{i,1} x'_{i,1} & \Sigma y'_{i,1} y'_{i,1} & \Sigma y'_{i,1} \\ \Sigma x'_{i,1} & \Sigma y'_{i,1} & M \end{bmatrix} \begin{bmatrix} h_{21} \\ h_{22} \\ h_{24} \end{bmatrix} = \begin{bmatrix} \Sigma x'_{i,1} y'_{i,2} \\ \Sigma y'_{i,1} y'_{i,2} \\ \Sigma y'_{i,2} \end{bmatrix},$$

where each sum is a sum over i=1, 2, ..., M, corresponding to the M previously-surveyed locations (i=1, 2, ..., M).

12. The method of claim 9, further comprising the step of choosing as said transformation T(G2;G1) the coordinate transformation $$x_2 = K(\cos\theta 12)x_1 + K(\sin\theta 12)y_1 + \Delta x_1,$$

$$y_2 = K(-\sin\theta 12)x_1 + K(\cos\theta 12)y_1 + \Delta y_1,$$

where K, $\theta 12$, $\Delta x_1$ and $\Delta y_1$ are selectable transformation parameters.

13. The method of claim 12, further comprising the steps of:

selecting said number p=2 and selecting all of said coefficients $e_m$ and $f_m$ equal to a common positive number; and choosing said transformation parameters K, $\theta 12$, $\Delta x_1$ and $\Delta y_1$ to satisfy the relations $$M\Delta x_1 - \sum_{i=1}^{M} x'_{i,2} = -K \sum_{i=1}^{M} (x'_{i,1}\cos\theta 12 + y'_{i,1}\sin\theta 12),$$

$$M\Delta y_1 - \sum_{i=1}^{M} y'_{i,2} = -K \sum_{i=1}^{M} (x'_{i,1}\sin\theta 12 + y'_{i,1}\cos\theta 12),$$

$$K \sum_{i=1}^{M} \{(x^2_{i,1} + y^2_{i,1}) + (\Delta x_1 - x'_{i,2})(x'_{i,1}\cos\theta 12 + y'_{i,1}\sin\theta 12) +$$

$$(\Delta y_1 - y'_{i,2})(-x'_{i,1}\sin\theta 12 + y'_{i,1}\cos\theta 12)\} = 0,$$

$$K \sum_{i=1}^{M} \{(\Delta x_1 - x'_{i,2})(x'_{i,1}\cos\theta 12 + y'_{i,1}\sin\theta 12) +$$

$$(\Delta y_1 - y'_{i,2})(-x'_{i,1}\sin\theta 12 + y'_{i,1}\cos\theta 12)\} = 0.$$

14. The method of claim 9, further comprising the step of selecting said LD signal sources from the class of satellite-based LD signal sources consisting of Global Positioning System satellites and Global Orbiting Navigational Satellite System satellites.

15. The method of claim 9, further comprising the step of selecting said LD signal sources from the class of ground-based LD signal sources consisting of signal beacons for transmitting Loran signals, Tacan signals, Decca signals, Omega signals, JTIDS Relnav signals and Personal Location Reporting Service (PLRS) signals.

* * * * *